US009964433B2

United States Patent
Du et al.

(10) Patent No.: US 9,964,433 B2
(45) Date of Patent: May 8, 2018

(54) ACOUSTIC SENSOR WITH AN ACOUSTIC OBJECT DETECTOR FOR REDUCING POWER CONSUMPTION IN FRONT-END CIRCUIT

(75) Inventors: Dingkun Du, Lebanon, NH (US); Kofi Odame, Hanover, NH (US)

(73) Assignee: THE TRUSTEES OF DARTMOUTH COLLEGE, Hanover, NH (US)

( * ) Notice: Subject to any disclaimer, the term of this patent is extended or adjusted under 35 U.S.C. 154(b) by 730 days.

(21) Appl. No.: 13/984,786

(22) PCT Filed: Nov. 10, 2011

(86) PCT No.: PCT/US2011/060229
§ 371 (c)(1),
(2), (4) Date: Aug. 9, 2013

(87) PCT Pub. No.: WO2012/108918
PCT Pub. Date: Aug. 16, 2012

(65) Prior Publication Data
US 2013/0322215 A1 Dec. 5, 2013

Related U.S. Application Data

(60) Provisional application No. 61/441,134, filed on Feb. 9, 2011, provisional application No. 61/454,834, filed on Mar. 21, 2011.

(51) Int. Cl.
*G01H 11/00* (2006.01)
*G01H 11/06* (2006.01)
*G10L 25/78* (2013.01)

(52) U.S. Cl.
CPC .............. *G01H 11/06* (2013.01); *G10L 25/78* (2013.01); *G10L 2025/786* (2013.01)

(58) Field of Classification Search
USPC ........................................................ 367/130
See application file for complete search history.

(56) References Cited

U.S. PATENT DOCUMENTS 6,044,952 A * 4/2000 Haggerty ................. G07D 7/12
194/207
7,495,998 B1 2/2009 Deligeorges
(Continued)

OTHER PUBLICATIONS

Pichevar, Ramin, et al. "Entropy-constrained spike modulus quantization in a bio-inspired universal audio coder." European Signal Proc. Conf., Lausanne, Switzerland. 2008.*
(Continued)

*Primary Examiner* — James R Hulka
(74) *Attorney, Agent, or Firm* — Lathrop Gage LLP

(57) ABSTRACT

An acoustic object detector for detecting presence of an acoustic signal is provided. The acoustic object detector includes a number of bandpass filters. Each bandpass filter is configured to convert an input signal into an analog signal within a frequency band. The acoustic object detector also includes a number of spike generating circuits each coupled to the respective bandpass filter. Each spike generating circuit is configured to generate a series of spike signals based upon an adaptive threshold for the analog signal. The acoustic object detection further includes a decision circuit configured to generate a digital signal at a time-frequency point from the series of spike signals.

21 Claims, 21 Drawing Sheets

(56) References Cited

U.S. PATENT DOCUMENTS

| | | | |
|---|---|---|---|
| 7,787,956 B2* | 8/2010 | Grayden et al. | 607/57 |
| 8,081,946 B2* | 12/2011 | Fudge | H04B 1/1036 455/295 |
| 8,130,991 B2* | 3/2012 | Rasmussen et al. | 381/317 |
| 2003/0026154 A1* | 2/2003 | Kang | G11C 11/22 365/211 |
| 2005/0192646 A1 | 9/2005 | Grayden et al. | |
| 2008/0253594 A1 | 10/2008 | Rasmussen et al. | |
| 2010/0159865 A1* | 6/2010 | Fudge | H04B 1/1036 455/296 |
| 2012/0023051 A1* | 1/2012 | Pishehvar et al. | 706/21 |

OTHER PUBLICATIONS

Pichevar, Ramin, and Hossein Najaf-Zadeh. "Pattern extraction in sparse representations with application to audio coding." European Signal Processing Conf., Glasgow, UK. 2009.*

Pichevar, Ramin, et al. "Auditory-inspired sparse representation of audio signals." Speech Communication 53.5 (2011): 643-657.*

International Search Report and Written Opinion issued in PCT/US2011/060229 dated Jun. 19, 2013, 9 pages.

\* cited by examiner

ACOUSTIC SENSOR WITH AN ACOUSTIC OBJECT DETECTOR FOR REDUCING POWER CONSUMPTION IN FRONT-END CIRCUIT

CROSS-REFERENCE TO RELATED APPLICATIONS

This PCT application claims the benefit of the filing date of U.S. Provisional Patent Application No. 61/454,834, filed Mar. 21, 2011, entitled "Acoustic Object Detector for Reducing Power Consumption in Front-End Circuit of Acoustic Sensor," and U.S. Provisional Patent Application No. 61/441,134, filed on Feb. 9, 2011, entitled "Dynamic power scaling for microphone analog front ends," the entire content of each of the above applications is incorporated herein by reference.

FIELD OF THE INVENTION

This invention relates to the field of acoustic sensors, and more specifically relates to an acoustic object detector that includes a nonlinear signal processor to provide significantly higher power efficiency to acoustic sensors that are self-powered or use a battery.

BACKGROUND OF THE INVENTION

Digital signal processing is used to process data from a sensor, such as an acoustic transducer. Digital signal processing typically requires a large number of mathematical operations to be performed quickly and repetitively on a set of data. As illustrated in FIG. 1A, sound source 112 generates sound waves or acoustic object 113, which are received by transducer 104 that converts sound waves 113 to analog voltage signals 105. Analog-to-digital converter (ADC) or front-end circuit 102 then converts analog voltage signals 105 to digital signals 103, which are manipulated digitally in digital signal processor (DSP) 114 to output digital signals 107. Then, digital-to-analog converter (DAC) 116 converts digital signals 107 to analog signals 109.

Conventional acoustic sensor 100 includes transducer 104, front-end circuit 102, as illustrated in FIG. 1B. Front-end circuit 102 converts analog signals 105 into digital signals 103. Front-end circuit 102 typically includes an analog-to-digital converter (ADC) 110. Front-end circuit 102 may also include preamplifier 106 and lowpass filter 108. DSP 114 receives and processes digital signals 103, and then converts digital signals 103 into analog signals 107, as illustrated in FIG. 1A.

To reduce the power consumption of front-end circuit 102, a duty cycling method may be used to periodically shut off front-end circuit 102. The disadvantage of this duty cycling method is that the acoustic sensor 100 may miss important signals.

Another approach to reducing power consumption uses a wake-up circuit to detect the energy distribution of analog signal 105 in time domain, either shutting off front-end circuit 102 or waking it up based upon comparison of the detectable energy against a threshold. However, this approach may wake up front-end circuit 102 even when a desired sound signal is not present. Furthermore, when processing sound signals, front-end circuit 102 uses constant performance parameters and thereby uses power unnecessarily.

A third approach uses DSP 114 to identify frequency characteristics of sound signal or acoustic object 113 and to scale the power consumption of the front-end circuit 102 as needed based upon the frequency characteristics. Referring to FIG. 1A again, conventional acoustic sensor 100 may digitize analog signals 105 to generate digital signal 103, and then may use DSP 114 to compute occurrences of acoustic object 113. Digital signal 107 from DSP 114 converts into analog control signal 111 by digital-to-analog convert (DAC) 116 to adjust front-end circuit 102. This approach requires constant use of front-end circuit 102, DSP 114 and DAC 116, having significant power consumption, hardware complexity and latency.

BRIEF SUMMARY

This disclosure advances the art and overcomes the problems outlined above by providing a non-linear processor that provides significantly higher power efficiency to acoustic sensors that are self-powered or use a battery. The disclosure provides devices and methods to reduce power consumption of the front-end circuit or to improve power efficiency for acoustic sensors.

In an embodiment, an acoustic object detector for detecting presence of an acoustic signal is provided. The acoustic object detector includes a plurality of bandpass filters each configured to convert an input signal into an analog signal within a frequency band. The acoustic object detector also includes a plurality of spike generating circuits each coupled to the respective plurality of bandpass filters, each spike generating circuit configured to generate a series of spike signals based upon an adaptive threshold for the analog signal. The acoustic object detector further includes a decision circuit configured to generate a digital signal at a time-frequency point from the series of spike signals.

In a particular embodiment, each spike generating circuit includes a comparator having the analog signal as a first input and the adaptive threshold as a second input and configured to compare the analog signal with the adaptive threshold to output a series of spike signals. Each spike generating circuit also includes a threshold generating circuit for generating the adaptive threshold toward the analog signal. The threshold generating circuit includes a $G_m$-C filter and a charge pump comprising a transistor switch, a current source and a capacitor coupled to the filter and the comparator, the charge pump being activated based upon a difference between the analog signal and the adaptive threshold to change the adaptive threshold.

In an alternative embodiment, the threshold generating circuit includes a resistor having a first end coupled to the first input of the comparator and a second end coupled to the second input of the comparator and a capacitor coupled to the second end of the resistor. The threshold generating circuit also includes a charge pump comprising a transistor switch, a current source and a capacitor coupled to the second input of the comparator, the charge pump being activated based upon a difference between the analog signal and the adaptive threshold to change the adaptive threshold. The adaptive threshold is configured to increase at a constant step until exceeding the analog signal and then decay toward the analog signal. The decision circuit includes an edge detection unit having an integrator coupled to a thresholding unit for generating an output from the series of spike signal, and a bandwidth encoding circuit to generate the digital signal from the output of the integrator.

In another embodiment, an acoustic sensor for adjusting power consumption based upon an acoustic signal is provided. The acoustic sensor includes a transducer for converting an acoustic signal into an electrical signal, and a dynamically-reconfigurable analog front-end. The acoustic sensor also includes an acoustic object detector configured to convert the electrical signal into a plurality of spikes based upon an adaptive threshold and to generate a digital signal in a binary form at a time-frequency point from the plurality of spikes.

In a particular embodiment, the acoustic object detector includes a plurality of bandpass filters configured to convert the electrical signal into an analog signal within a frequency band and a plurality of spike generating circuits configured to generate the series of spike signals from the analog signal. The acoustic object detector also includes a decision circuit configured to generate the digital signal at a time-frequency point from the series of spike signals. The analog front-end includes a preamplifier, an analog-to-digital converter and a lowpass filter. The acoustic sensor further includes a power management module coupled between the acoustic object detector and the analog front-end to control the power consumption of the analog front-end. The transducer includes a microphone, and the acoustic signal includes a sound signal. The acoustic object detector includes a speech edge detector. Each spike generating circuit includes a comparator having the analog signal as a first input and an adaptive threshold as a second input and configured to compare the analog signal with the adaptive threshold to output the series of spike signals. Each spike generating circuit also includes a threshold generating circuit for generating the adaptive threshold toward the analog signal.

In a particular embodiment, the threshold generating circuit includes a $G_m$-C filter and a charge pump comprising a transistor switch, a current source and a capacitor coupled to the filter and the comparator. The charge pump activates based upon a difference between the analog signal and the adaptive threshold to change the adaptive threshold. In an alternative embodiment, the threshold generating circuit includes a resistor having a first end coupled to the first input of the comparator and a second end coupled to the second input of the comparator, and a capacitor coupled to the second end of the resistor. The threshold generating circuit also includes a charge pump comprising a transistor switch, a current source and a capacitor coupled to the second input of the comparator, the charge pump being activated based upon a difference between the analog signal and the adaptive threshold to change the adaptive threshold. The adaptive threshold is configured to increase at a constant step until exceeding the analog signal and then decay toward the analog signal. The decision circuit includes an edge detection unit having an integrator coupled to a thresholding unit for generating an output from the series of spike signal. The decision circuit also includes a bandwidth encoding circuit to generate the digital signal from the output of the thresholding unit.

In a further embodiment, a spike generating circuitry for extracting an acoustic signal and encoding the acoustic signal as a series of spikes is provided. The spike generating circuitry includes a comparator having a signal input and an adaptive threshold input and configured to compare the signal input with the adaptive threshold input to output a series of spike signals, and a threshold generating circuit for generating an adaptive threshold toward the signal input.

In a particular embodiment, the threshold generating circuit includes a $G_m$-C filter coupled to the signal input and the adaptive threshold input of the comparator. The threshold generating circuit also includes a charge pump comprising a transistor switch, a current source and a capacitor coupled to the adaptive threshold input of the comparator, the charge pump being activated based upon a difference between the signal input and the adaptive threshold to change the adaptive threshold input.

In an alternative embodiment, the threshold generating circuit includes a resistor having an end coupled to the adaptive threshold input of the comparator, and a capacitor coupled to the end of the resistor. The threshold generating circuit also includes a charge pump comprising a transistor switch, a current source and a capacitor coupled to the comparator, the charge pump being activated based upon a difference between the signal input and the adaptive threshold to change the adaptive threshold input.

The adaptive threshold input increases at a constant step until exceeding the signal input and then decays toward the signal input.

Additional embodiments and features are set forth in part in the description that follows, and in part would become apparent to those skilled in the art upon examination of the specification or may be learned by the practice of the invention. A further understanding of the nature and advantages of the present invention may be realized by reference to the remaining portions of the specification and the drawings, which forms a part of this disclosure.

DETAILED DESCRIPTION

Figure 1A:
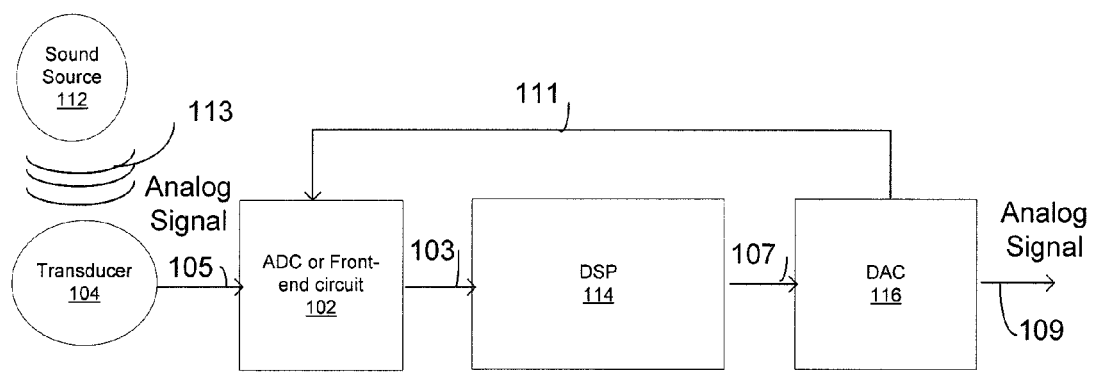
FIG. 1A is a schematic diagram showing a prior art digital signal processor for processing data from a sound source.
Figure 1B:
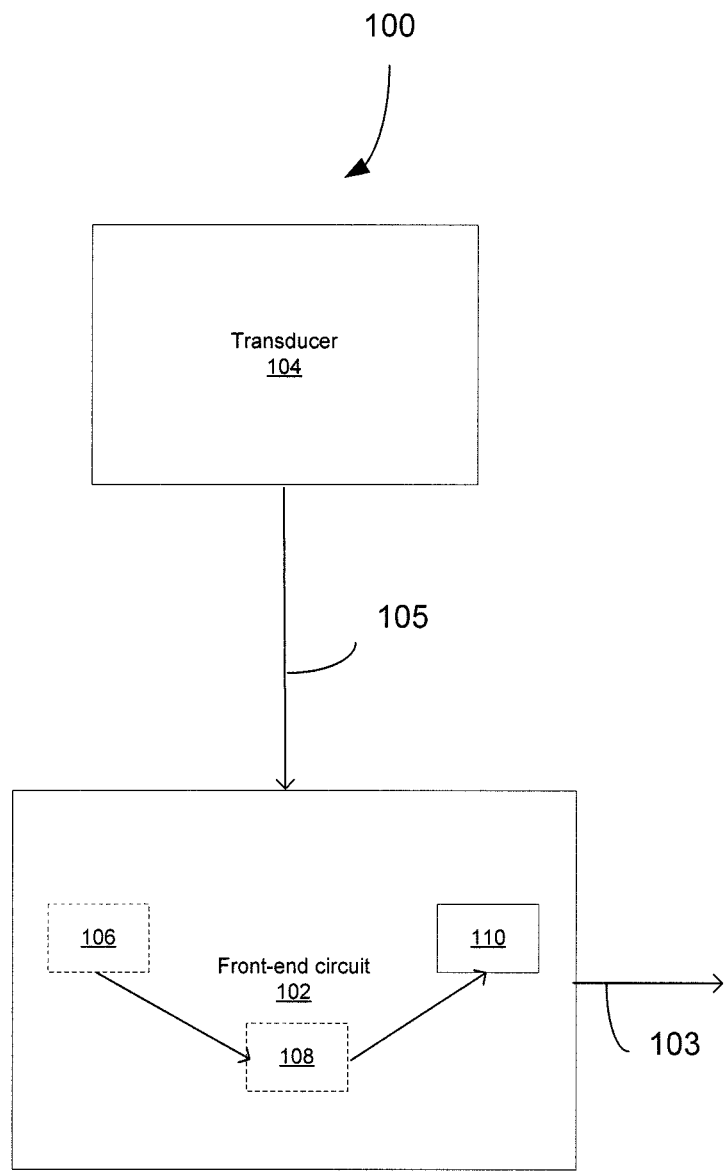
FIG. 1B is a schematic diagram showing a front-end circuit of a conventional acoustic sensor.

The present disclosure may be understood by reference to the following detailed description, taken in conjunction with the drawings as briefly described below. It is noted that, for purposes of illustrative clarity, certain elements in the drawings may not be drawn to scale.

Figure 2:
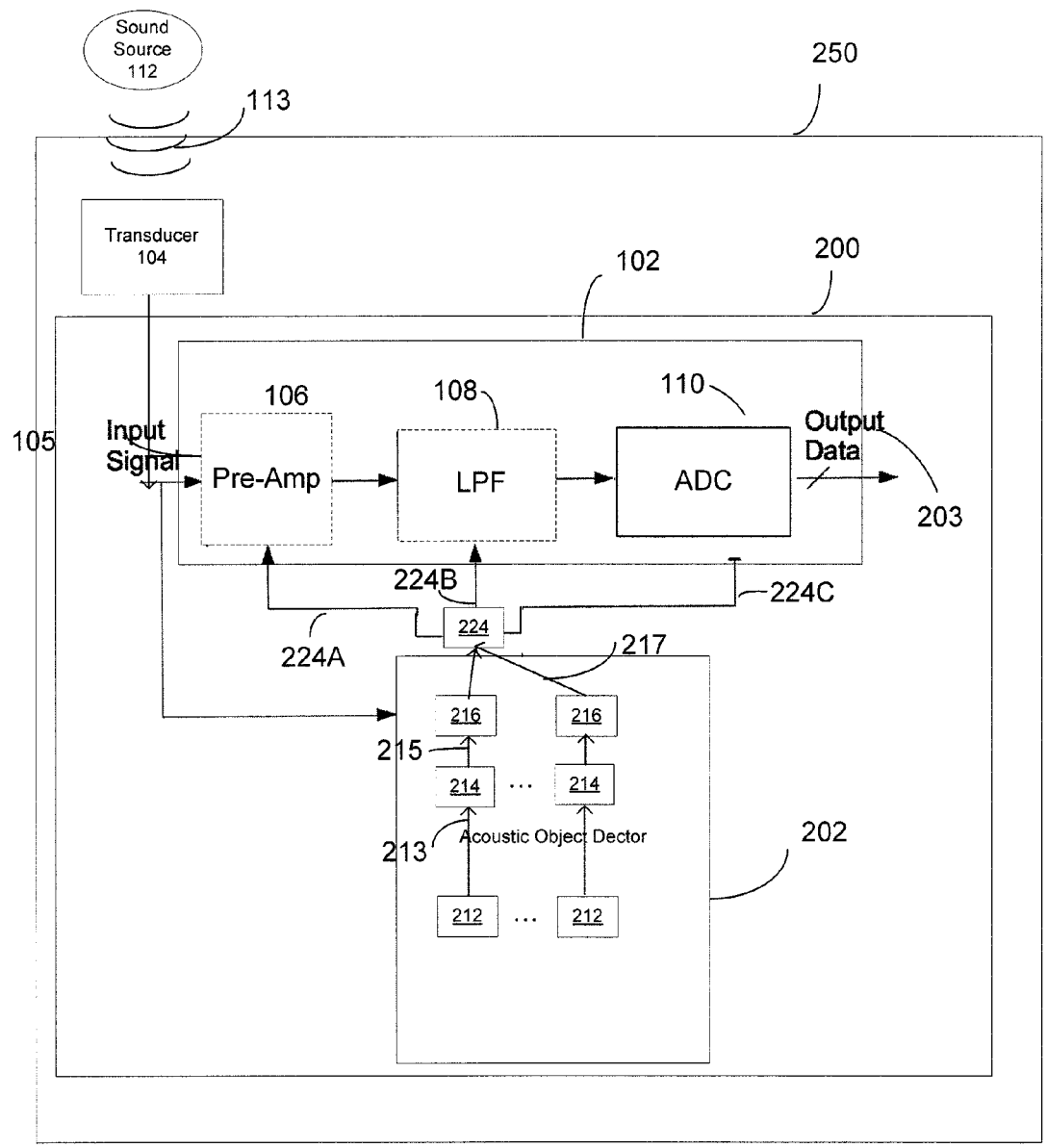
FIG. 2 is a schematic diagram showing a smart front-end circuit that includes an acoustic object detector and a front-end circuit of a smart acoustic sensor, in an embodiment.

FIG. 2 is a schematic diagram illustration that includes an acoustic object detector and a front-end circuit of a smart acoustic sensor, in an embodiment. Smart acoustic sensor 250 includes a transducer 104 and a smart front-end circuit 200. Smart front-end circuit 200 has reduced power consumption compared to conventional acoustic sensor 100 through use of an acoustic object detector 202. Smart front-end circuit 200 includes acoustic object detector 202 and conventional front-end circuit 102. Transducer 104 converts sound wave 113 from sound source 112 into electrical analog signal 105. Front-end circuit 102 receives analog signals 105 from transducer 104 and converts the analog signals 105 into digital signal 203.

Acoustic object detector 202 receives input signal 105 from transducer 104 and extracts frequency content or determines frequency content from input signal 105. Acoustic object detector 202 then sends control signals 224A-C to preamplifier 106, lowpass filter 108 and ADC 110 of front-end circuit 102 of smart front-end circuit 200, respectively, to adjust performance of each component (106, 108 and 110) of front-end circuit 102 that receives input signal 105 and outputs digital signal 203.

Acoustic object detector 202 continuously maps analog signal 105 received from transducer 104 onto a time-frequency plane using a nonlinear algorithm. The highest frequency content of detected acoustic object 113 is determined and used to adjust the performance of front-end circuit 102. The bandwidth of lowpass filter 108 and the sampling rate of ADC 110 may be adjusted to accommodate the determined highest frequency content or bandwidth. The noise level of preamplifier 106 may be adjusted such that the total integrated noise of front-end circuit 102 remains constant. Front-end circuit 102 operates to consume power only when needed.

Acoustic object detector 202 is designed to use a power of not more than 10 μW, which is only 5% of the power use of front-end circuit 102 without acoustic object detector 202, i.e. about 200 μW. Therefore, most power consumed by smart front-end circuit 200 is by front-end circuit 102. Thus, smart front-end circuit 200 reduces power consumption by adjusting the performance of front-end circuit 102 and thus provides higher power efficiency for smart acoustic sensor 250.

Acoustic object detector 202 includes a set of bandpass filters 212, a set of spike generating circuits 214 and a set of decision-making circuits 216, as illustrated in FIG. 2. A major task in acoustic object detection is to identify sudden changes in energy that occur within a given frequency band. Spike generating circuit 214 encodes the rate of change of signal energy as a series of spike signals. This is different from a conventional approach that rectifies an analog signal of acoustic object 113 from transducer 104, to filter the analog signal to find the time derivative, and then to determine whether this time derivative exceeds a pre-determined threshold, after each analog signal is separated into various frequency bands.

Figure 3:
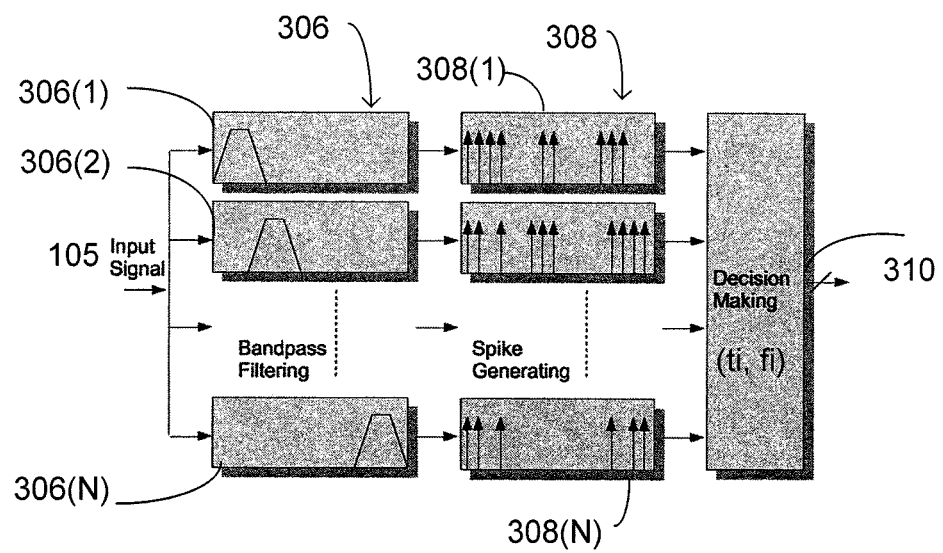
FIG. 3 is a diagram of signals from bandpass filters, spike generating circuits and decision-making circuits of acoustic object detector of FIG. 2.

FIG. 3 is a diagram of signals from bandpass filters 212, spike generating circuits 214 and decision-making circuits 216 of acoustic object detector of FIG. 2. As illustrated in FIG. 3, input signal 105 is simultaneously received by each of the plurality of bandpass filters 212 that are configured to have different frequency bands, as shown by graphs 306(1)-(N). Each spike generating circuit 214 outputs a spike signal 215 based upon the energy change rate of one bandpassed signal 213, as shown by graphs 308(1)-(N). If the energy level of bandpassed signal 213 increases, spike signal 215 is generated with a high density of spikes from spike generating circuit 214. If the energy level of bandpassed signal 213 remains constant, the spike signals may be generated with a moderate density from spike generating circuit 214. Each decision-making circuit 216 receives spike signals 215 from each spike generating circuit 214 and outputs digital signal 217 in a binary form (0 or 1) at a time-frequency point $(t_i, f_i)$, as shown by block 310. Signal 217 is thus the output signal from acoustic object detector 202.

Output signal 217 of acoustic object detector 202 determines whether there is important acoustic information within input signal 105 at a specific time-frequency point.

Referring to FIG. 2 again, with output signal 217 from decision-making circuit 216, control signals 224A-C are generated by a controller 224 based upon output signal 217 and control performance of preamplifier 106, lowpass filter 108 and ADC 110, to reduce the power consumption of front-end circuit 102. For preamplifier 106, noise power density is inversely proportional to power consumption. If acoustic object detector 202 detects, at some time point, input signal 105 that has a maximum frequency of $f_0$, while the full bandwidth of the signal is $f_f$, the noise power density of preamplifier 106 may be increased by a factor of $f_f/f_0$. At the same time, the bandwidth of lowpass filter 108 is decreased by a factor of $f_f/f_0$. As a result, the total output integrated noise of preamplifier 106 and LPF 108 remains substantially constant, such that the dynamic range remains substantially constant. For ADC 110, sampling rate is proportional to power consumption, and may be reduced by a factor of $f_f/f_0$. Therefore, the power consumption of preamplifier 106 and ADC 110 may both be decreased by a factor of $f_f/f_0$.

Preamplifier 106 and ADC 110 are usually dominant in the power consumption by front-end circuit 102, for example, consuming about 95% of the power consumption of front-end circuit 102. Therefore, smart front-end circuit 200 may have a power consumption of a fraction of $f_0/f_f$ of the power consumption with full bandwidth.

It is worth mentioning that power consumption of lowpass filter 108 does not necessarily decrease when maximum frequency $f_0$ decreases. If an (operational transconductance amplifier-capacitor (OTA-C) filter is used as lowpass filter 108, maximum frequency $f_0$ is proportional to power consumption. If an active-RC filter is used as lowpass filter 108, maximum frequency $f_0$ has a weak relation to power consumption. Because the power consumption of lowpass filter 108 is a small fraction of that of front-end circuit 102, e.g. less than 5%, smart front-end circuit 200 still saves energy regardless of type of low pass filter 108.

In an embodiment, a state model for spike generating circuit 214 that is a nonlinear signal processor may be expressed as:

$$dx/dt = 2H(y) + 0.1(u-x) \quad \text{Equation (1)}$$

$$dy/dt = \text{sign}(u-x) - y \quad \text{Equation (2)}$$

where "u" is input signal 213 received from bandpass filters 212, "y" is output spike signal 215, and "x" is a variable threshold of smart front-end circuit 200. H(y) is a Heaviside function, and sign(u−x) is a sigmoid function. In the nonlinear signal processor, steep changes in bandpassed signal 213 may be detected to find onsets and offsets in each bandpassed signal 213. The changes may be encoded as spike density.

Figure 4:
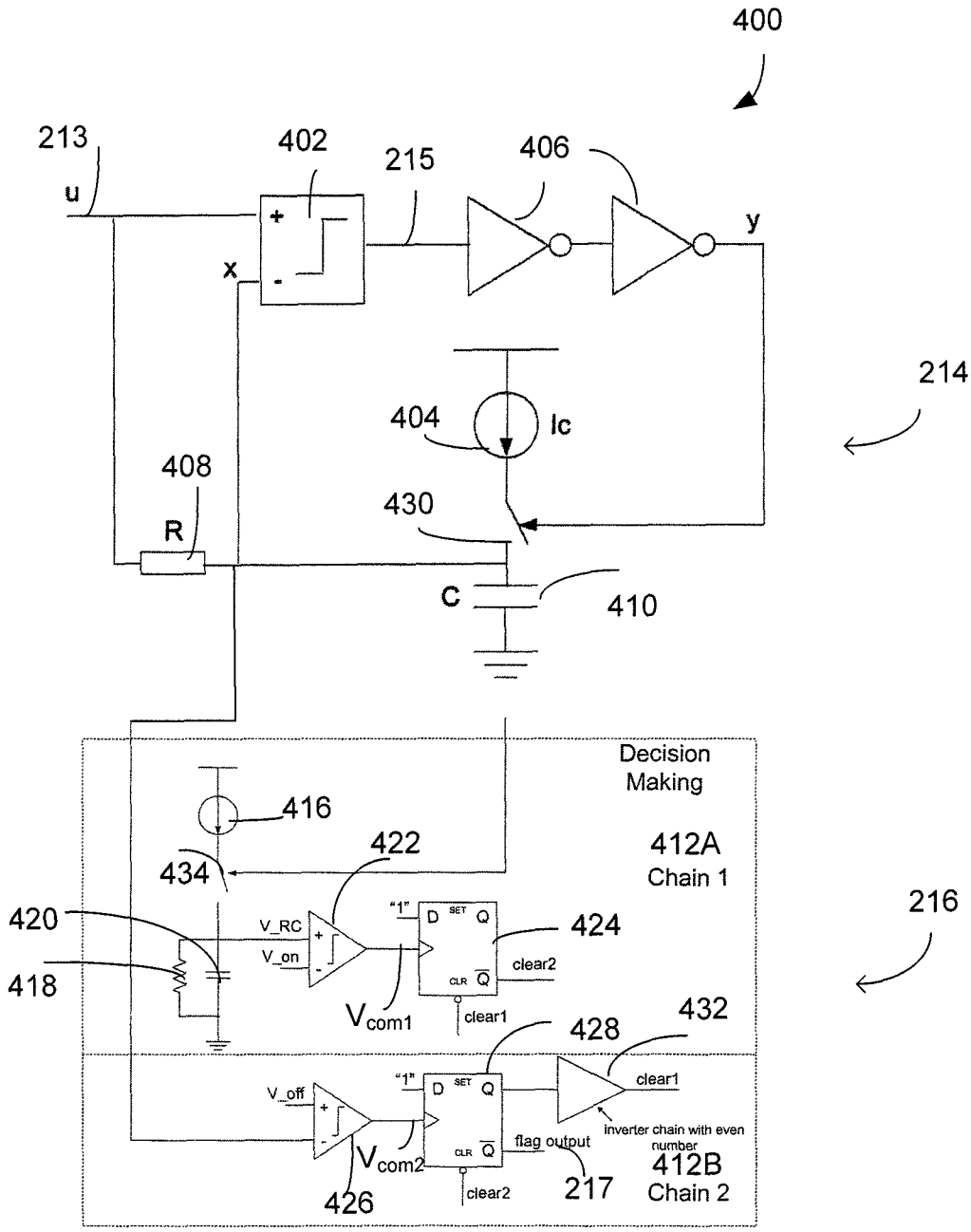
FIG. 4 is an exemplary circuit diagram of the spike generating circuit that is a nonlinear signal processor with the decision-making circuit of FIG. 2.

One exemplary spike generating circuit 214, for converting bandpassed signals 213 into spike signals 215, is illustrated in FIG. 4. Specifically, spike generating circuit 214 includes a comparator 402, a resistor 408, a capacitor 410, a current source 404 and a switch 430 for charging capacitor 410 to increase the value of threshold "x". Comparator 402 compares input bandpassed signal 213 received from bandpass filter 212 with a variable threshold "x" to generate spike signals 215. RC filter includes capacitor 410 and resistor 408 in series connection to provide an adaptive threshold "x" and slow decay of threshold "x" in conjunction with current source 404 and switch 430 controlled by spike signals 215. Spike generating circuit 214 also includes inverters 406 to delay spike signals 215. The number of inverters 406 must be even.

Figure 5A:
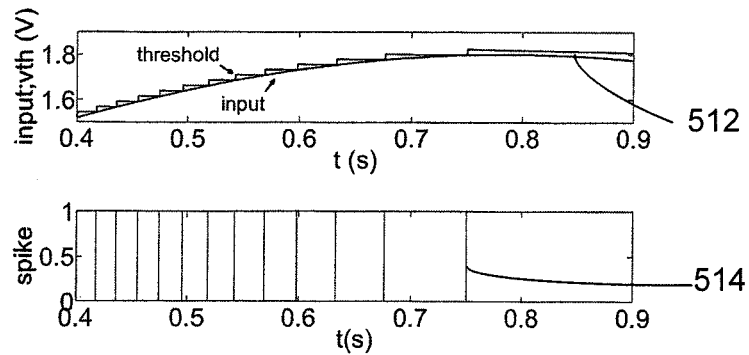
FIG. 5A illustrates an exemplary input signal having varying amplitudes that is input to the spike generating circuit and an exemplary output signal from the spike generating circuit with threshold "x" in steps.
Figure 5:
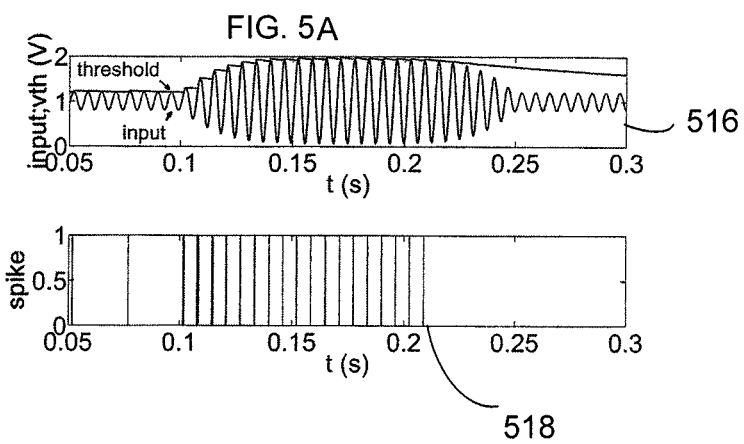
FIG. 5B illustrates a sinusoidal input signal to spike generating circuit and an output signal from spike generating circuit with threshold "x" in steps.
FIG. 5C illustrates zoomed input signal and zoomed output signal of FIG. 5B.
FIG. 5D shows asymmetric response of adaptive threshold in an embodiment.

FIG. 5A illustrates one exemplary waveform 512 representing bandpassed signal 213 having varying amplitudes that is input to spike generating circuit 214 and one exemplary graph 514 representing output signal 215 from the spike generating circuit with threshold "x" in steps. As illustrated in FIG. 5A, the threshold "x" increases at a step to reach a peak of waveform 512, and then slowly decays before reaching the next rising of waveform 512 again. The threshold "x" adapts to waveform 512 in the following way. Initially, a low threshold $x_0$ is set for comparator 402, such that waveform 512 at time $t_0$ is higher than the low threshold $x_0$ causing comparator 402 to generate a high output "1". Then, the threshold "x" adaptively increases to exceed waveform 512 at time $t_1$ causing comparator 402 to generate a low output "0". Next, the threshold "x" decays slowly until it becomes smaller than the waveform 512, such that comparator 402 generates a high output "1". This process repeats for each time step of threshold "x".

Figure 5C:
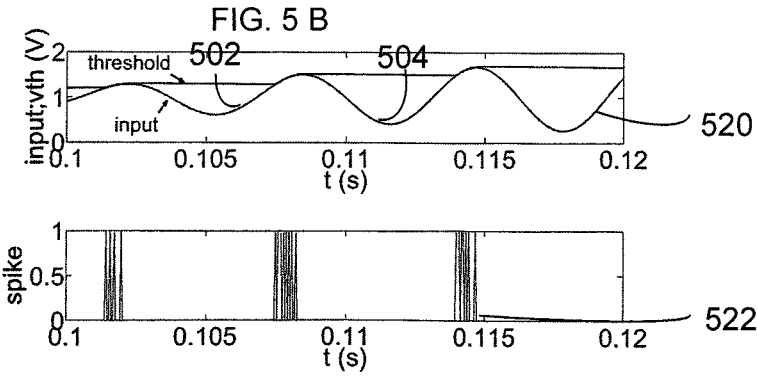

In a particular embodiment, bandpassed signal 213 may be a sinusoid signal with variable amplitudes. As shown in FIG. 5B, waveform 516 representing bandpassed signal 213 and graph 518 representing spike signal 215. Referring to FIG. 5C (zoomed view of FIG. 5B) now, when the amplitude of a rising portion 502 of waveform 520 increases steeply in a short time, the threshold "x" takes more steps to reach the peak of the sinusoid signal, and then slowly decays. Spike signals 215 of high-density are generated in the rising portion 502, as shown in graph 522 representing spike signals 215. When amplitudes are small, the threshold "x" takes a few steps to reach the peak of waveform 520. When the amplitude becomes consistently large, the spike density reduces. When the amplitude of falling portion 504 of waveform 520 decreases, the threshold "x" decays slowly and thus separates from waveform 520, and few spike signals or no spike signals are generated in falling portion 504 of waveform 520. This process continues for each step of threshold "x". The density of spike signals generated by spike generating circuit 214 determines the beginning (onset 704) and the end (offset 706) of a sound event 702 (see FIG. 7).

Figure 5D:
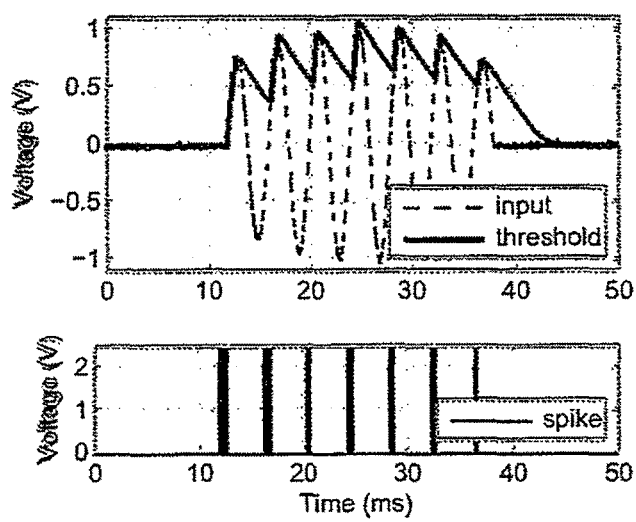

As FIG. 5D shows, the asymmetric response of the threshold produces a high spike density during increases in signal amplitude and a low spike density during falls in signal amplitude. Also, large amplitude signals will have more opportunities for spikes to be generated than will small amplitude signals.

It is noted that the spike density for a large-amplitude signal is usually higher than that of a low-amplitude signal. The reason for this is that rates of amplitude change in a short time for large-amplitude signals are still greater than for low-amplitude signals, such that the threshold "x" may take more steps to reach its maximum value.

For spike generating circuit 214, the relationship between input signal "u" and spike output signal "y" is expressed as:

$$dx/dt = I_c H(y)/C + (u-x)/RC \quad \text{Equation (3)}$$

where R is resistance of resistor 408, C is capacitance of capacitor 410, $I_c$ is a constant current of current source 404. Equation (3) is obtained based upon Kirchhoff's circuit law, where (u−x)/R is the current through resistor 408, $H(y)I_c$ is current from constant current source 404, and Cdx/dt is current through capacitor 410.

Relationship between the input and output of comparator 402 may be described as $v_{out} = v_{dd} H(u-x)$, where $v_{dd}$ is a constant. $\tau_0$ is a parameter to approximate the delay effect of comparator 402, inverters 406 and capacitor 410. A delay between $v_{out}$ and "y" may be set as $\tau_0$ such that $v_{out}(0=y(t+\tau_0)$. Differentiation of "y" may be approximated by:

$$dy/dt=(y(t+\tau_0)-y(t))/\tau_0=(v_{dd}H(u-x)-y(t))/\tau_0 \quad \text{Equation (4)}$$

By the first order derivative in equation (4), spike generating circuit 214 provides a conversion of bandpassed signal 213 into a series of spike signals 215. If $t_0$ is small enough, this approximation is accurate. It should be noted that equation (4) is an approximation to the operation of spike generating circuit 214. For multiple delay devices, such as comparator 402, inverters 406 and capacitor 410, the delay is generally characterized by a higher-order differential equation. However, this delay is very small and does not significantly affect the circuit performance, such that a first-order derivative is adequate to approximate the multiple delay devices. Equations (1)-(4) of spike generating circuit 214 are nonlinear, which allows smart acoustic sensor 250 to effectively achieve high power and hardware-efficiency.

Output spike signal 215 of comparator 402 controls charging on capacitor 410 through switch 430 to increase the threshold "x". For example, when input signal "u" is higher than threshold "x", a high output spike signal 215 of comparator 402 opens switch 430 to charge capacitor 410 with current source 404 and make threshold "x" jump to a higher level. Next, when threshold "x" jumps to be higher than input signal "u", a low output signal 215 of comparator 402 shuts off switch 430.

Spike signal "y" or spike signal 215 may convert to a logical code to control switch 430. When unit step function H(y) is 1, spike signal "y" is "HIGH" or has a logical code "1". When H(y) is 0, spike signal "y" is "LOW" or has a logical code "0". This unit step function H(y) converts the spike signal "y" to a logical code. Switch 430 may be a MOSFET. H(y) may indicate if switch 430 is "ON" or "OFF".

The threshold "x" has a slow decay due to RC filter (i.e. resistor 408 and capacitor 410). If input signal "u" rises above threshold "x", the above process repeats. Preferably, a large value of RC may be required to implement the slow decay operation. RC value may be 100 to 200 ms.

Spike generating circuit 214 and decision-making circuit 216 may be integrated in one circuit 400, as shown in FIG. 4. Decision-making circuit 216 receives spike signals 215 from spike generating circuit 214 and generates flag output 217. Specifically, decision-making circuit 216 includes first and second chains 412A and 412B that interact and control each other by clear signals (clear1 and clear2) in first D flip-flop 424 of first chain 412A and second D flip-flop 428 of second chain 412B. First and second chains 412A-B determine both onset and offset of sound event 702 (see FIG. 7) in each frequency band $f_i$ of bandpass filters 212, respectively. Flag output 217 indicates the occurrence of significant input signal 105 in binary codes. As a result, flag output 217 provides binary codes in real time to indicate if there is significant input signal 105 in a specific frequency band $f_i$.

Referring to first chain 412A of decision-making circuit 216 now, spike signals 215 control switch 434 causing current source 416 to charge capacitor 420, which integrates spike signals 215 to a voltage called $V_{RC}$. For example, if spike signals 215 have a high density, switch 434 is closed to allow current source 416 to charge on capacitor 420, while if spike signals 215 have a low density, switch 434 is open to disable charging on capacitor 420.

Resistor 418 is in parallel connection with capacitor 420. Therefore, if the spike density of signal 215 is low, i.e. the time interval between two spike signals is larger than a time constant RC (e.g. RC may be 20 to 40 ms) of first chain 412A, $V_{RC}$ may be charged from zero to some voltage level and then may drop to zero. If the spike density of signal 215 is high, i.e. the time interval between two spike signals is much smaller than the time constant RC, $V_{RC}$ is continuously charged from zero to a relatively higher level. The time constant RC of first chain 412A is chosen to allow charging accumulation on capacitor 420. If $V_{RC}$ is higher or lower than a constant onset threshold $V_{on}$, comparator 422 of first chain 412A outputs $V_{com1}$ as "1" or "0" respectively, and sends $V_{com1}$ to a D flip-flop 424 of first chain 412A as a clock signal. If $V_{com1}$ changes from "0" to "1", D flip-flop 424 activates and sends input signal D to output Q. Qb in second chain 412B provides flag output 217 for decision-making circuit 216.

When flag output 217 is "1", significant input signal 105 is present in frequency band $f_i$. If the spike density of spike signal 215 is high enough, $V_{com1}$ is a higher voltage than an onset threshold $V_{on}$, and $V_{com1}$ rises. The rise of $V_{com1}$ makes Qb in first chain 412A become "0" and make flag output 217 become "1", i.e. spike signal 215 of high density converts to the binary code "1". If flag output 217 jumps to "1" when one of spike signals 215 is significant, the beginning of sound event 702 or an onset (see FIG. 6B) of sound event 602 is detected.

Referring to second chain 412B now, an offset (see FIG. 6B) of sound event 602 is determined in second chain 412B. If spike signal 215 has high spike density, spike signal 215 feeds to comparator 426 of second chain 412B when switch 430 is closed. Otherwise, spike signal 215 does not feed to comparator 426 when switch 430 is open. If spike signal 215 drops below an offset threshold voltage $V_{off}$, output $V_{com2}$ of comparator 426 becomes "1", which generates a clock signal for second D flip-flop 428 of second chain 412B to refresh its Q based upon the value of D. A delay device (e.g. inverter chain 432) resets clear1 to "1" before clock signal $V_{com1}$ rises after Q in second chain 412B. The number of inverters in inverter chain 432 must be an even number. The delayed Q from inverter chain 432 is sent to deal in first D flip-flop 424 of first chain 412A.

One feature of smart front-end circuit 200 is that its spike generating circuits 214 is much simpler than a conventional DSP 114. Spike generating circuit 214 of acoustic object detector 202 directly extracts frequency information of input signal 105 without data conversion from DAC 116 and without computing occurrences of acoustic objects using DSP 114 (see FIG. 1A), such that smart front-end circuit 200 may significantly increase the power- and hardware-efficiency. As a result, smart acoustic sensor 250 is more power efficient than conventional acoustic sensor 100. Also, smart acoustic sensor 250 does not rely on taking time derivative as conventional acoustic sensor 100 does. Furthermore, smart acoustic sensor 250 is more robust against spurious artifacts and noise than the conventional acoustic sensor.

Acoustic object 113 may have a relatively wide frequency span, for example, several adjacent frequency bands with flag output 217 of "1". Assume $n_t$ as a threshold number of adjacent bands or channels with flag output 217 equal to "1". If there are fewer bands than the $n_t$ adjacent bands with flag output 217 of "1", the input signal 105 is considered as ambient noise, such that flag output 217 refreshes to "0" for these bands or channels of ambient noise. More specifically, assume that each of frequency band $f_i$ is 1 kHz and there are $N=2^n$ of frequency bands, and thus the full frequency band is N kHz. A vector of binary code a(1:N) may be generated at any time point $t_i$. $i_{max}$ is the maximum number of frequency channels, expressed as max(i), which may be obtained for a(i)=1. For example, if there are 8 frequency channels, when time $t_i$ is 1 s and a(1:8) is (0; 0; 1; 1; 0; 0; 0; 0), $i_{max}$ would be 4 because channels 5-7 are "0", and channel 4 is "1". At a different time, e.g. $t_i$ is 1:2 s, for a(1:8) of (0; 0; 0; 0; 0; 0; 1; 1), $i_{max}$ would be 8 because channel 8 is "1". If a(1:N) are all zeros, there is no important acoustic information in all frequency channels, such that front-end circuit 102 may be in a sleep mode.

Once $i_{max}$ is found, power saving may be estimated for smart front-end circuit 200 or smart acoustic sensor 250. The power consumption of preamplifier 106 is inversely proportional to the noise density. The bias current of preamplifier 106 controls the noise density. The bias current may be set to $I_0 i_{max}/N$, where $I_0$ is the bias current for full bandwidth. The bandwidth of lowpass filter 108 may be set by a RC constant of lowpass filter 108. Capacitance C may be set to $C_0 N/i_{max}$, where $C_0$ is the capacitance for full bandwidth. The sampling rate of analog-to-digital converter (ADC) 110 may be set by a frequency divider for a sampling clock. The division rate of the frequency divider is set to $D_0 i_{max}/N$, where $D_0$ is the division rate for full bandwidth.

Figure 6A:
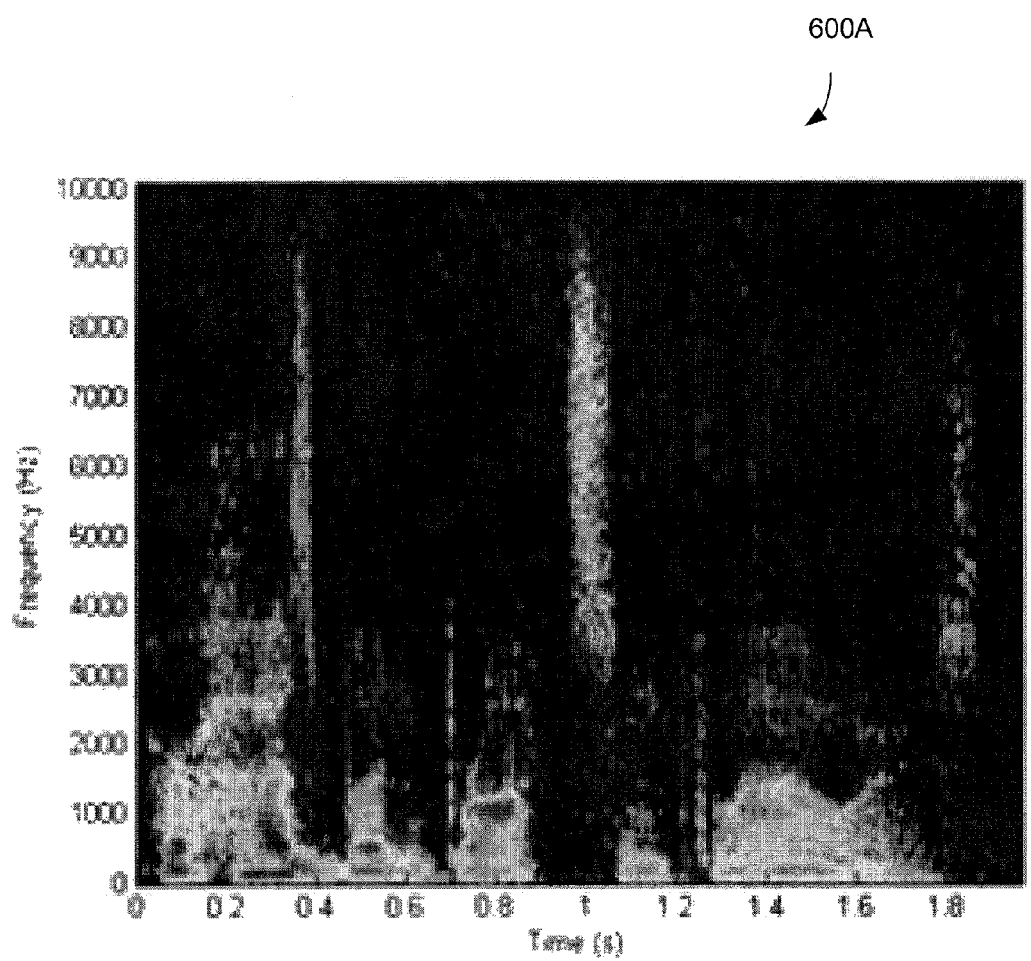
FIG. 6A is an exemplary spectrogram illustrating sound signals.

In a particular embodiment, one exemplary spectrogram 600A, as illustrated in FIG. 6A, is a segment of male speech: "Her husband brought some flowers." with background noise. For example, area between 0.2 s and 0.4 s has a maximum frequency $f_0$ of acoustic object of about 3 kHz. This allows front-end circuit 102 to use a bandwidth of 3 kHz rather than the full bandwidth of 10 kHz, during this period. The power consumption during this period is therefore 30% of the power consumption of that when using the full bandwidth. More specifically, the noise power density of preamplifier 106 may be increased to 1/0.3=3:33 times of the noise power density for full bandwidth, while the bandwidth of lowpass filter 108 may be decreased to 30% of the full bandwidth, and the sampling rate of ADC 110 may be decreased to 30% of that for full bandwidth. If the acoustic object has a uniform distribution among frequency bands, the power consumption of smart acoustic sensor 250 may be about 50% of that of conventional acoustic sensor 100 without acoustic object detector 202.

Figure 6B:
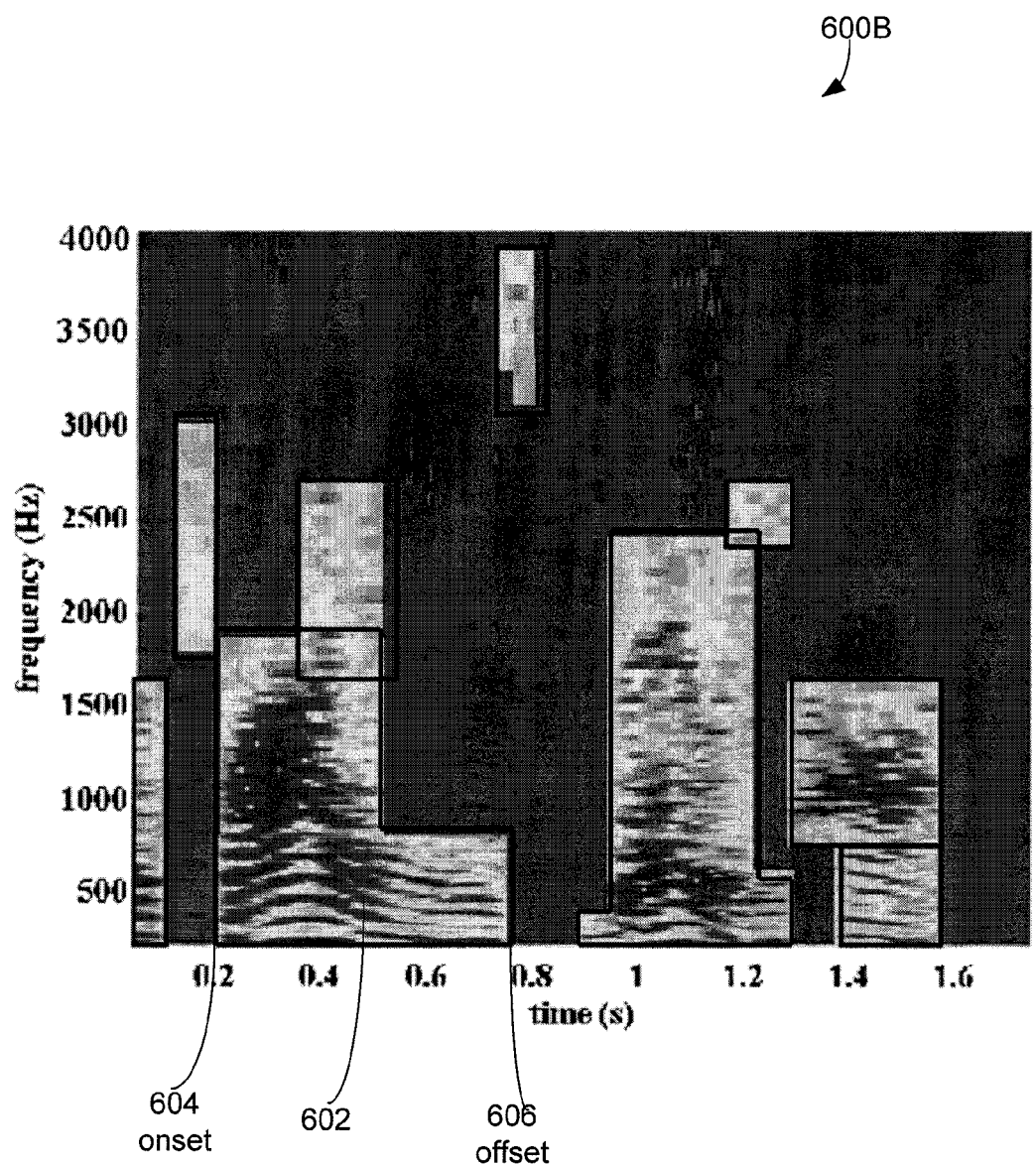
FIG. 6B is another exemplary spectrum illustrating onset and offset of a sound event.

FIG. 6B is another exemplary spectrum 600B illustrating onset and offset of a sound event which is an acoustic object. Inside polygons are sound events 602. Each sound event 602 has an onset 604 that is at the leftmost border and marks the beginning of sound event 602. Each sound event 602 also has an offset 606 that is at the rightmost border and marks the end of sound event 602.

There are many potential applications for acoustic object detector 202. For example, acoustic object detector 202 may be fabricated as a part of a new semiconductor chip that includes ADC 110, also optionally includes pre-amplifier 106 and lowpass filter 108 as well as acoustic object detector 202, for use in commercial products, such as microphones, iPhones, mobile phones, telephone, and hearing aids etc. This new semiconductor chip may replace the conventional ADC 102.

Bio-Inspired Ultra-Low-Power Spike-Encoding Circuit for Speech Edge Detection

An exemplary spike generating circuit for building a prototype is disclosed below. Speech edge detection can be used to adaptively control the performance and improve the energy efficiency of smart audio sensors. A spike-encoding circuit is used for real-time and low-power speech edge detection. The circuit can directly encode the signal's envelope information by asynchronous spikes' temporal density without additional envelope extraction. Furthermore, the spike-encoding automatically adapts its encoding resolution to the amplitude of the input signal, which improves encoding resolution for small signal without directly increasing power consumption. The spike-encoding circuit may be fabricated in 0.5 µm CMOS process, and may consume 300 nW power.

A real-time algorithm is disclosed for detecting the edges of speech in the time-frequency plane in smart audio sensors, which only process the speech portions of the spectrum, while discarding any non-speech audio that may be simultaneously present. The primary challenge of such an algorithm is to maintain good performance even in low signal-to-noise-ratio (SNR) conditions. A spike-encoding circuit is applied to each of several frequency channels, each encoding circuit needs to be area and power efficient. In addition, the spike-encoding robustly indicates the edges of each speech component. That is, the spiking pattern must highlight the temporal onset and offset of each speech component, where an onset is characterized by a sudden and simultaneous increase in amplitude, and an offset is characterized by a decrease in amplitude. The speech onsets/ offsets usually occur across a number of adjacent frequency bands. Also, the spiking pattern may highlight the highest and lowest spectral components of the speech at any given time.

The spike-encoding circuit can output a train of spikes with varying density. Specifically, the spike train density should increase both as a function of signal amplitude and as a function of signal amplitude change. In a time dimension, there is a high density of spikes during speech onsets and a low density of spikes during speech offsets. In a frequency dimension, there is a higher density of spikes in a frequency band where there is speech, compared to those bands where there is no speech. The spike-encoding circuit is based on a comparator, which has an input for the audio signal within a given frequency band. Whenever the comparator detects an input that exceeds a threshold level, it outputs a spike. In order to vary the density of the resulting spike train, the comparator adapts threshold appropriately. The comparator gives a positive output whenever the input signal exceeds the threshold. This positive output is short lived like a spike, because the threshold responds by increasing to pass the input signal level. The comparator gives a negative output whenever the threshold exceeds the input signal. The threshold then responds to the negative output by slowly decaying towards the input signal.

Figure 7:
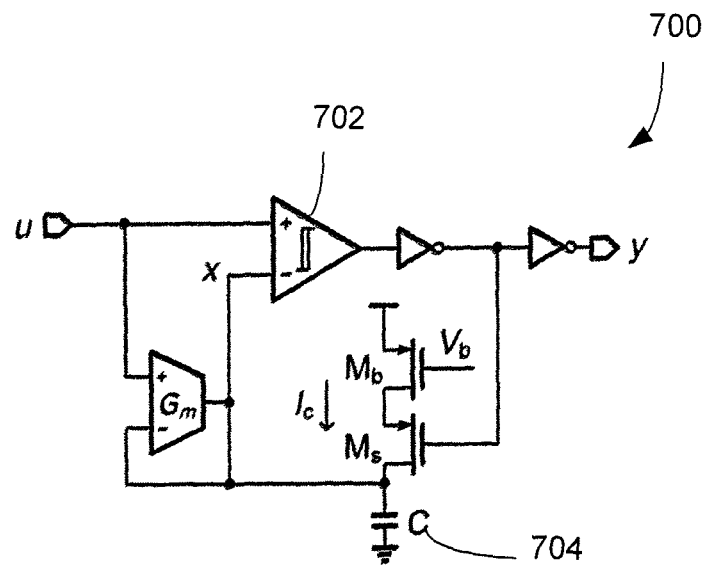
FIG. 7 illustrates a spike-encoding circuit schematic for speech edge detection in an embodiment.

FIG. 7 illustrates a spike-encoding circuit schematic for speech edge detection in an embodiment. The spike-encoding circuit 700 includes a $G_m$-C filter that causes the variable threshold to adapt towards the input, where $G_m$ is transconductance and C is the capacitance of capacitor 704. $G_m$ is a particular implement of the resistor 408 of spike generating circuit 400 by connecting its output with its negative input, and has an equivalent resistance $R=1/G_m$. The spike-encoding circuit 700 also includes PMOS transistors $M_b$ and $M_s$. A charge pump including $M_b$, $M_s$ and capacitor 704 is activated whenever a spike output y is generated.

The dimensionless normalized state-space model for the spike-encoding circuit 700 is:

$$dx/dt=(y+1)I_c/2V_aC+G_m(u-x)/C \qquad \text{Equation (5)}$$

$$dy/dt=\text{sgn}(u-x)-y \qquad \text{Equation (6)}$$

where u, x, and y denote an input signal, a threshold and a spike output, respectively. Also, sgn(•) is a sigmoidal function, $I_c$ is current of the transistor or current source $M_b$, τ is the delay of comparator 702, and $V_a$ is the highest input amplitude in order to normalize the expression for dx/dt.

If input signal u is higher than threshold x, the spike output y of comparator 702 goes high, which activates the transistor or switch $M_s$ for transistor $M_b$ or current source. The current source $M_b$ then quickly charges the capacitor 704 and make threshold x jump to a higher level. Typically, threshold x jumps higher than input signal u, forcing the output y of comparator 702 low, which in turn shut offs the current source $M_b$. Then, threshold x starts to decay towards input signal u with a time constant $\tau_d = C/G_m$. The entire process repeats itself when input signal u gets higher than threshold x again.

The spikes generated by the spike-encoding circuit 700 are used to determine the speech events by spike density. The number of spikes that occur during a time window $T_0$ determines the density of the spike train. A low value of $T_0$ makes the decision latency shorter, while a large value makes the decision more robust to sudden interference and decreases the required spike-encoding resolution. For example, $T_0$ may be set as 10 ms by empirical testing. Since the time window or observation time interval $T_0$ is fixed, the spike density is equivalent to the number of spikes $N_d$, that occur within the $T_0$ time window. For the spike density to carry useful information, the number of spikes that occurs within the $T_0$ time window should be able to vary over an appropriately large range. In particular, the number of spikes should be able to fall low enough to indicate a reduction in signal amplitude, i.e. an offset, and it should be able to raise high enough to indicate a rise in signal amplitude, i.e. an onset. For time window $T_0=10$ ms, a reasonable number of spikes to represent low spike density is $N_{off}=1$, while a reasonable number of spikes to represent high spike density is $N_{on}=4$. The spike density needs to remain higher than $N_{off}$ when there is no offset, but the signal experiences a drop in amplitude. The decay time constant $\tau_d$ is chosen such that the spike-encoding circuit 700 generates at least $N_{off}+1$ spikes, when there is no offset. For example, decay time constant $\tau_d$ may be 1 ms.

Figure 8:
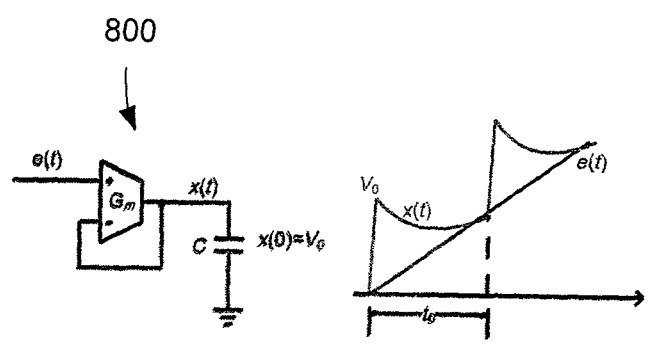
FIG. 8 illustrates a simplified circuit model for threshold decaying (left) and threshold variation for smooth envelope (right).

FIG. 8 illustrates a simplified circuit model for threshold decaying (left) and the threshold variation for smooth envelope (right) in an embodiment. Simplified circuit 800 neglects the fluctuations of the envelope and the hysteresis of comparator 702. The spike train density increases both as a function of signal envelope and as a function of signal envelope change. It is of interest to find the relationship between spike density and envelope voltage rising to select a suitable $N_{on}$ to decide onset. The spike density only needs to be higher than $N_{off}$ between onset and offset, and is ensured by selecting a suitable decay time constant $\tau_d$. Therefore, it is important to determine the encoding transfer function between the input envelope voltage rising and output spike number $N_d$, both observed in time window $\tau_d$. The nonlinearity of the spike-encoding circuit 700 makes difficult to gain intuition of the encoding performance, especially the feature of adaptive encoding resolution, directly. Therefore, a simplified linear model for the spike-encoding circuit is developed.

Assume that, within $T_0$, the input can be considered a smooth linear function as $e(t)=kt=V_e t/T_0$ mimicking an ideal envelope, where $V_e$ is the envelope voltage in $T_0$. According to FIG. 8, after threshold jumps by an initial voltage constant $V_0$, the decaying function x(t) can be described by:

$$\tau_d dx/dt + x(t) = e(t) \qquad \text{Equation (7)}$$

with initial condition $x(0)=V_0$, x(t) is obtained as:

$$x(t)=(V_0+k\tau_d)e^{-t/\tau_d}+kt-k\tau_d \qquad \text{Equation (8)}$$

The time $t_0$ is the threshold that takes to reach back the signal, as illustrated in FIG. 8. By setting x(t)=e(t), and $t_0$ is expressed as:

$$t_0=\tau_d \ln(1+V_0 T_0/V_e \tau_d) \qquad \text{Equation (9)}$$

So, the spike number $N_d$ generated in $T_0$ is expressed as:

$$N_d=f_s(V_e)=\text{rounded integer}(T_0/\tau_d \ln [1+(V_0 T_0)/(V_e \tau_d)]) \qquad \text{Equation (10)}$$

where the encoding performance is related to time constant $T_0$, delay time constant $\tau_d$, and initial voltage constant $V_0$. Because time constant $T_0$ and delay time constant $\tau_d$ are chosen by the reasons described earlier, initial voltage constant $V_0$ is the critical parameter to determine the encoding transfer function.

Referring to FIG. 7 again, the rate of voltage change on the capacitor 704 is approximately $I_c/C$. As the comparator 702 needs $\tau$ to shut off the switch $M_s$ and discontinue the charging, the jump step size of the threshold can be expressed as $V_0=I_c\tau_d/C$. The rate of voltage change $I_c/C$ should be fast enough to make the jump exceed the input signal quickly, so that $V_0$ is proportional to $\tau_d$. This transfer function of Equation (10) is plotted in FIG. 9 with $V_0=50$ mV.

Figure 9:
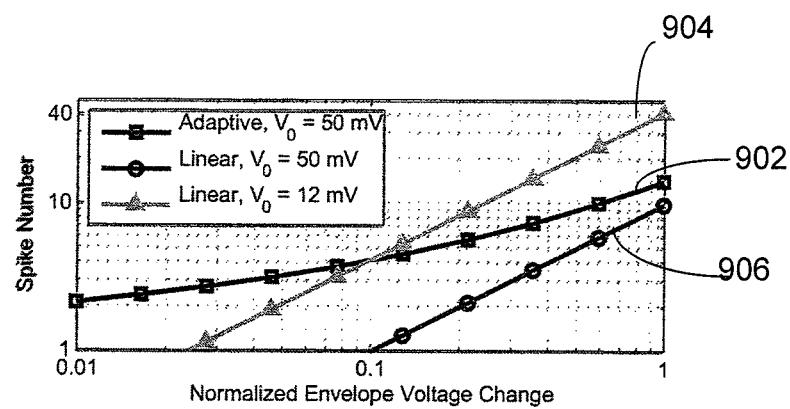
FIG. 9 illustrates an input envelope voltage change and unrounded output spike number in $T_0$ for adaptive encoding and linear encoding with different threshold step sizes in an embodiment.

FIG. 9 illustrates an input envelope voltage change and unrounded output spike number in $T_0$ for adaptive encoding and linear encoding with different threshold step sizes in an embodiment. The input envelope voltage change is normalized with $V_a=500$ mV. The other parameters used for all the plots 902, 904, and 906 are $T_0=10$ ms and $\tau_d=1$ ms. Note that the input-output relationship or transfer function for the adaptive encoding 902 is nonlinear. The adaptive encoding is more accurate for small envelope changes while it is coarser for larger envelope changes. This means a smaller envelope change generates enough spikes to trigger onset, so that the detection sensitivity is increased. For comparison, the transfer functions for the linear encoding 904 and 906 are also shown in FIG. 9. Note that the linear encoding scheme has a lower resolution with the same $V_0$. If the onset threshold sets to 0.1 $V_a$, then the adaptive encoding scheme makes corresponding spike number $N_{on}=4$, while linear encoding makes spike number $N_{on}$ less than 1. If $V_0=15$ mV, then spike number $N_{on}=4$. The adaptive encoding allows to use a larger $V_0$ for the same spike number $N_{on}$, so that a smaller $\tau$ can be used to reduce the speed requirement of comparator 702 and therefore its power consumption.

Figure 10:
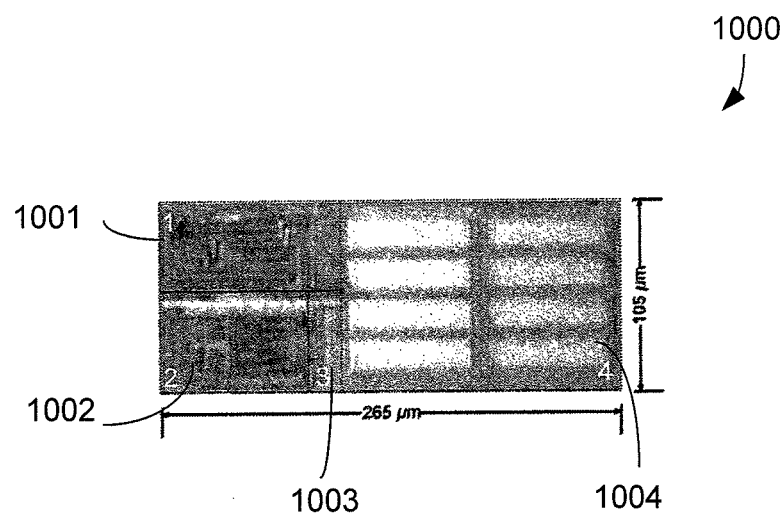
FIG. 10 illustrates a micrograph of the spike-encoding circuit of FIG. 7.

FIG. 10 illustrates a micrograph of the spike-encoding circuit 700 in an embodiment. Micrograph 1000 includes area 1001 for transconductor, area 1002 for comparator, area 1003 for current source and switch, and area 1004 for the poly-to-poly capacitor. The die size of the spike-encoding circuit 700 may be 265 μm by 105 μm. The comparator 702 is a three-stage open loop amplifier and does not respond to small noise signal and interference, so that there would be few spikes generated when speech events are absent. In a particular embodiment, the delay of comparator 702 and inverter 706 is approximately 12 μs. The decaying time constant $\tau_d=C/G_m=1$ ms, C=8 pF, and $G_m=8$ nS. The current source implemented by the PMOS transistor $M_b$ provides 90 nA current and the transistor length L is 20 μm for high output resistance, such that $V_0=I_c\tau_d/C=135$ mV.

Figure 11:
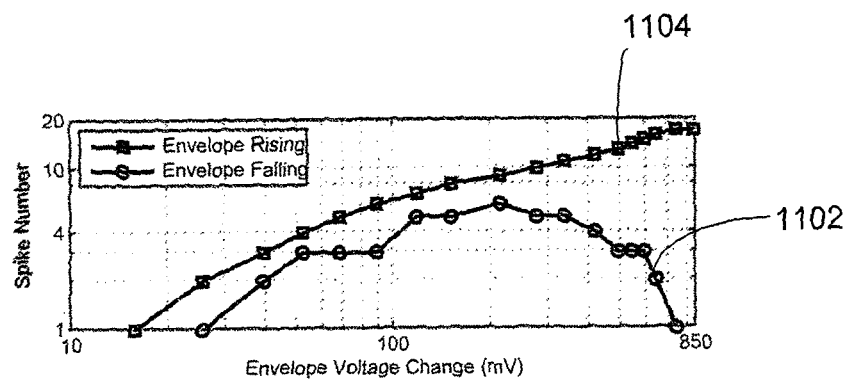
FIG. 11 shows an input-output transfer function of the spike-encoding circuit of FIG. 7 for both the envelope rising and falling.

FIG. 11 shows the input-output transfer function of the spike-encoding circuit 700 for both the envelope rising and falling in an embodiment. Specifically, FIG. 11 illustrates spike number and envelope voltage change both in 10 ms time window. Envelope rising curve 1102 and falling curve 1104 are both recorded. The carrier frequency for testing is 4 kHz. If spike number $N_{on}=4$ and spike number $N_{off}=1$, then the envelope rising of more than 50 mV can trigger an onset. Also, spurious offsets are not detected for amplitude changes in the range of 50-600 mV, since the spike number for the falling envelope is greater than spike number $N_{off}$, as discussed earlier. Within an effective encoding range, the output spike number monotonously increases with the increase of envelope voltage change, so that the input dynamic range is 34 dB, covering the telephony quality speech dynamic range. The spike-encoding circuit 700 shows higher resolution for smaller envelope rising, so that the encoding scheme is adaptive. The output spike number range is 17 or 25 dB, which is compressed by the adaptive encoding resolution. Because high resolution is only needed for small envelope change to detect the onset easily, there is no need to waste power consumption to get the same resolution for high envelope change as long as the high envelope change exceeds the threshold. The power consumption of the spike-encoding circuit 700 is 300 nW under 2.5 V power supply, which is very low compared to the power consumption of analog circuit front-end 102.

Along with the spike-encoding circuit 700, a bandpass filter is fabricated with a tunable center frequency and bandwidth on the same chip. The bandpass filter's transfer function tunes to match each channel in a 16-channel filter bank. The speech sample separates into 16 constituent frequency components or bandpassed signals. Next, the spike-encoding circuit 700 processes each of the 16 components of the signal to obtain a series of spikes for each bandpassed signal. Finally, the spike number $N_d$ is determined by using $N_{on}=4$ and $N_{off}=1$ to get the speech event edges, i.e. onset/offset points.

Figure 12:
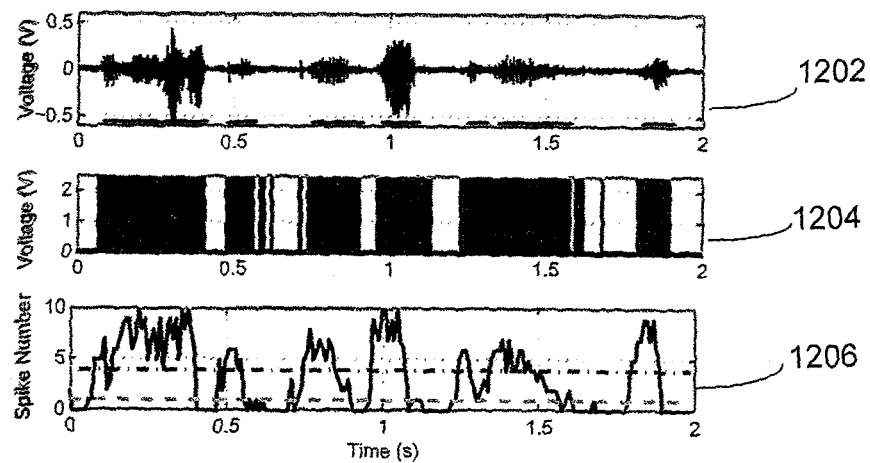
FIG. 12 illustrates measurement results of a bandpass speech signal centered at 3.2 kHz (the highest frequency channel) in an embodiment.

FIG. 12 illustrates measurement results of a bandpass speech signal centered at 3.2 kHz (the highest frequency channel) for the 16th channel in an embodiment. The top graph 1202 is the input signal with the identified speech event by spike density shown as the straight lines below the waveform, the middle graph 1204 is the corresponding spike train, and the bottom graph 1206 is the spike number counted in 10-ms time window with the two dashed lines indicating the onset and offset thresholds.

Figure 13:
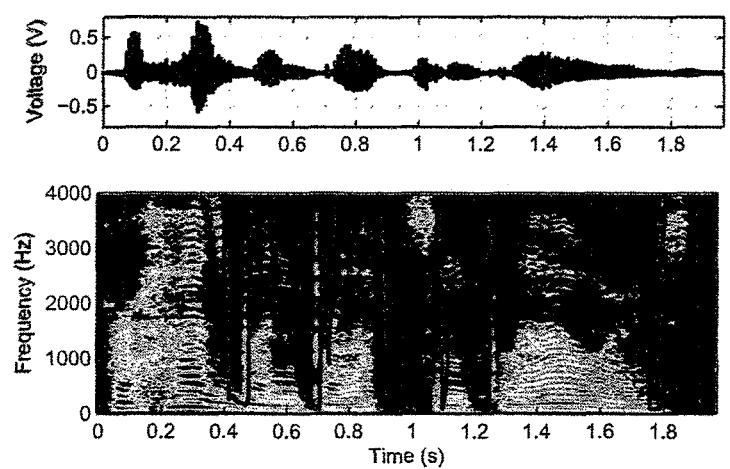
FIG. 13 illustrates a speech sample and its spectrogram, with the extracted speech edge shown on the spectrogram in an embodiment.

FIG. 13 illustrates a speech sample 1302 and its spectrogram 1300, with the extracted speech edge 1306 on the spectrogram 1300 for all 16 channels in an embodiment. The speech edge 1306 comes from the measurement results of the spike-encoding circuit 700.

In summary, the spike-encoding circuit 700 can identify the edges of speech events with self-adaptive resolution. Because the spike-encoding circuit has a small die size and also a low power consumption, it is promising to be embedded in smart audio sensors for identifying speech event edge and eventually save the power consumption of the smart audio sensors.

Efficient Speech Edge Detection for Mobile Health Applications

The following section discloses a computational algorithm used by the acoustic object detector. In a particular embodiment, the transducer 102 of FIG. 2 may be a microphone, and the acoustic object detector 202 of FIG. 2 may be a speech edge detector that directly analyzes the output of the microphone and scans the microphone for the presence of speech. The speech edge detector then adjusts the performance parameters (and hence power consumption) of the front-end circuitry to accommodate the highest detected speech frequency. Among the parameters that can be adjusted are the noise power spectral density of the preamplifier, the cutoff frequency of the filter, and the sampling rate of the analog-to-digital converter.

Speech includes high energy acoustic components that are sparsely distributed in the time-frequency plane. The goal of a speech detection algorithm is to identify these high energy speech objects and to separate them from the ambient background. The simplest algorithms depend solely on signal energy, but tend to miss all but the most prominent speech objects, and are useful only for high signal-to-noise ratio (SNR) situations. More robust algorithms typically perform multiple processing iterations on seconds-long speech samples, which are not suitable for real-time and low latency applications. Some biologically-inspired algorithms have been shown to be both real-time and robust to noise. Unfortunately, these algorithms are based on models of the mammalian auditory system that are computationally costly to implement.

The biologically-inspired algorithm using a spike-encoding scheme is much less computationally intensive than conventional methods. The spike-encoding scheme is low cost. The algorithm is based on a time-frequency decomposition that separates the audio signal into several frequency channels. The information in each of these channels is then encoded as a series of spikes. For a given channel, the density of spikes is an encoding of the signal's rate of change of energy; beyond some baseline, a high spike density indicates an increasing level of energy, and a low spike density indicates a decreasing level of energy. Also, the timing of each spike is an encoding of the signal's phase information for that channel. The onset of a speech object is characterized by a sudden and near simultaneous increase in acoustic energy across a number of adjacent frequency channels. The spike-encoding represents this event as a region of high spike density in the time frequency plane. The offset, or termination, of a speech object is characterized by a sudden and near-simultaneous decrease in acoustic energy across a number of frequency channels. This event is represented by a region of low spike density in the time-frequency plane. Thus, to extract the edges of a speech object, the algorithm simply performs a hysteretic thresholding of the spike density.

The first stage of the algorithm is a bank of bandpass filters, which separates the audio signal into several frequency channels, thereby performing a time-frequency decomposition. The center frequencies of the bandpass filters, such as $G_m$-C filters, are distributed logarithmically from 100 Hz to 4 kHz. Simulations demonstrate that, a bank of 128 of the $G_m$-C filters implemented in a 0.5 μm process consumes only 4 μW. The tradeoff of this low power consumption is that the SNR of the $G_m$-C filters is limited to only 40 dB. However, the algorithm is able to track the instantaneous bandwidth of speech in even lower SNR conditions.

Figure 14:
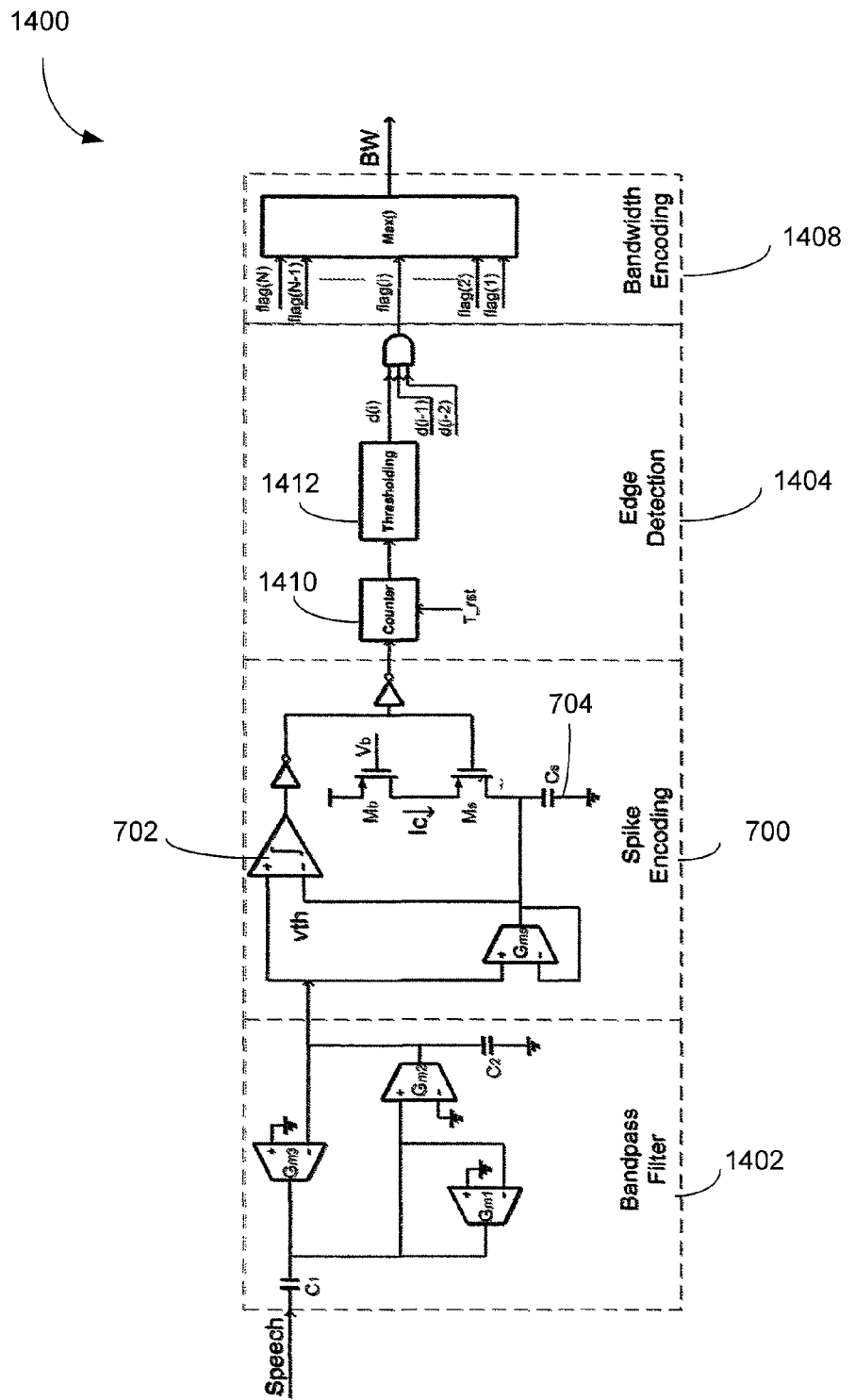
FIG. 14 illustrates a single channel for the speech edge detection algorithm in an embodiment.

FIG. 14 illustrates a single channel 1400 for the speech edge detection algorithm in an embodiment. The single channel 1400 includes bandpass filter 1402, spike-encoding circuit 700, and decision making circuit 1404 that includes an edge detection unit 1406 and a bandwidth encoding unit 1408. The bandpass filter 1402 extracts a signal that is contained in a given frequency band. This signal is then processed by spike-encoding circuit 700, which converts modulation information into a series of spikes. In the edge detection unit 1406, a counter 1410 integrates the spikes from the single channel and produces an output through thresholding unit 1412. The edge detection unit 1406 may include chain 412A and chain 412B of FIG. 4. The counter 1410 may include current source 416, switch 434, resistor 418 and capacitor 420. The thresholding unit 1412 may include comparators 422, 426, components 424 and 428, and inverter 432. Depending on the number of spikes present, the edge detection unit 1404 may register the presence of speech. Finally, the bandwidth of the speech is output by the bandwidth encoding unit 1408.

The output of each filter $G_m$-C is processed by spike-encoding circuit 700, shown in FIG. 14. A spike is generated every time the input voltage of this circuit 700 exceeds the threshold voltage of comparator 702. The spike generated activates a charge pump formed by transistors $M_b$ and $M_s$ as well as capacitor 704. This raises the threshold voltage by a discrete amount. The threshold voltage then slowly decays towards the input voltage via the low pass filter that is formed by the $G_m$s and Cs circuit. If the input voltage exceeds the threshold voltage, then a spike is generated and the whole process repeats. The spike train is an encoding of the audio signal's energy modulation at that particular frequency channel. Specifically, the rate of spiking is proportional to the rate of change of energy in the input voltage for the given frequency channel. A high rate of spiking indicates an increasing amount of energy, a low rate of spiking indicates a reducing amount, and a baseline rate indicates a constant amount of energy.

The edge detection unit 1406 and the bandwidth encoding unit 1408 are the final stages of the real time algorithm. Each spike train is aggregated with the spike trains from neighboring frequency channels and fed to a counter 1410 in the edge detection block. The counter 1410 integrates the number of spikes that occur within a time constant $T_0$, for example, 10 ms. If the number of detected spikes exceeds a high threshold, then this is recognized as the onset of a speech object. If the number of detected spikes falls below a low threshold, then this is recognized as the offset of a speech object. The bandwidth encoding unit 1408 processes the edge detection decisions from all of the frequency channels. At any given time, the instantaneous bandwidth of speech is determined by identifying the highest frequency channel that contains a speech object.

Figure 15A:
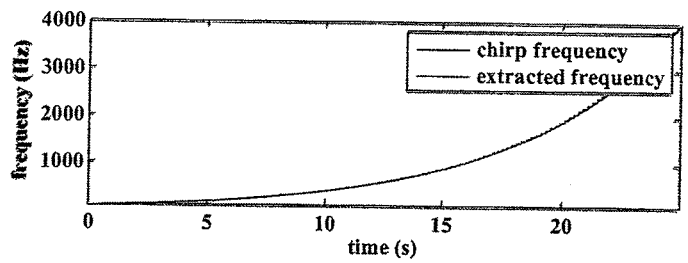
FIG. 15A illustrates results for processing a chirp signal with frequency swept from 100 Hz to 4 kHz in an embodiment.
Figure 15B:
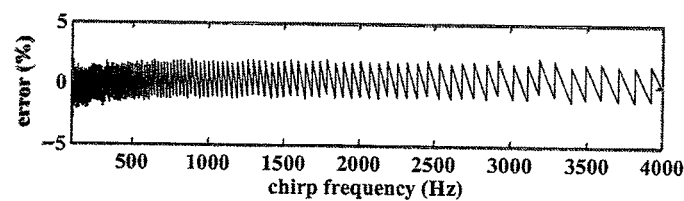
FIG. 15B illustrates the error of the algorithm is primarily due to quantization noise in an embodiment.

The algorithm was simulated in MATLAB and tested on a chirp signal, which slowly increases in frequency from 100 Hz to 4 kHz. FIG. 15A illustrates algorithm results for processing a chirp signal with frequency swept from 100 Hz to 4 kHz in an embodiment. The algorithm is able to extract the correct instantaneous frequency of the chirp signal, as evidenced by the aligned curves for chirp frequency and extracted frequency. FIG. 15B illustrates the error of the algorithm is primarily due to quantization noise. The output frequency range of the algorithm is logarithmically divided into 128 discrete levels. The ratio of adjacent levels is 103:100, hence the maximum relative error (which is due to quantization) is 3%.

Figure 16A:
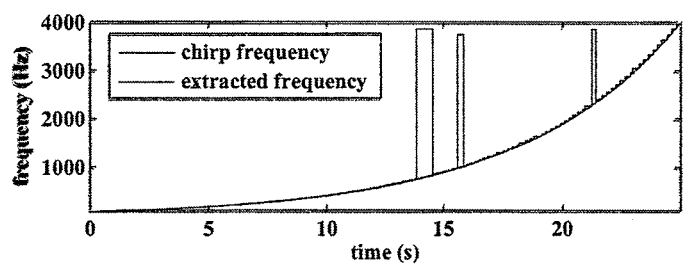
FIG. 16A illustrates results for processing a chirp signal with frequency swept from 100 Hz to 4 kHz in an embodiment.
Figure 16B:
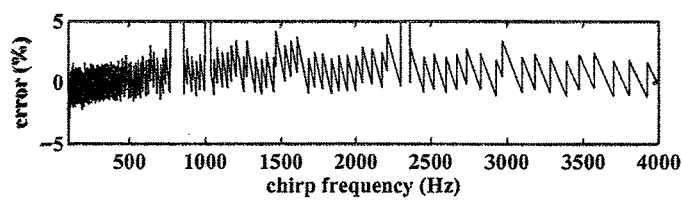
FIG. 16B illustrates that the error of the algorithm is primarily due to quantization noise in an embodiment.

FIG. 16A illustrates results for processing a chirp signal with frequency swept from 100 Hz to 4 kHz in an embodiment. Included in the signal is white noise that has an average energy of −10 dB relative to the chirp. Despite the low SNR, the algorithm is largely able to extract the correct instantaneous frequency of the chirp signal. There are, however, occasional spurious outputs. FIG. 16B illustrates that the error of the algorithm is primarily due to quantization noise in an embodiment. A couple of frequency points do produce a large amount of error, due to the low SNR conditions.

As FIGS. 15A-B and 16A-B show, the algorithm successfully extracted the instantaneous bandwidth of the chirp, even when the chirp is buried in a significant amount of noise. To quantify the algorithm's accuracy, a relative error is given as:

$$\text{err} = (f_{ext} - f_{act})/f_{act} \qquad \text{Equation (11)}$$

where $f_{ext}$ is an extracted bandwidth, and $f_{act}$ is an actual instantaneous bandwidth.

For a clean chirp signal, the average error of the algorithm is 0.75%. The algorithm maintains an error of less than 1% for signal-to-noise ratio (SNR) levels as low as 10 dB.

Figure 17:
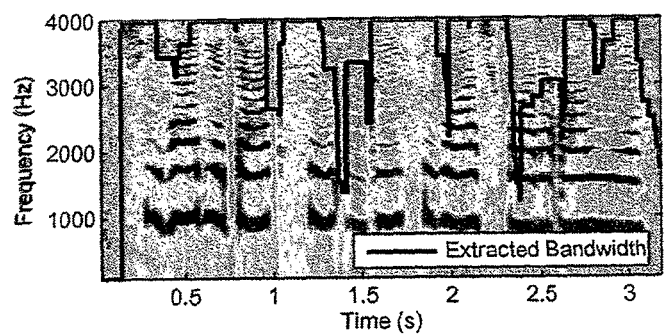
FIG. 17 illustrates an extracted bandwidth of a speech sample in an embodiment.

The algorithm performance is also obtained on actual speech samples. For each sample, the actual instantaneous bandwidth is first calculated by making use of statistical information about the speech sample as a whole. Then, the speech sample is extracted with an estimated instantaneous bandwidth. The accuracy of the algorithm is defined by comparing the extracted bandwidth to the actual bandwidth for each time point. FIG. 17 illustrates an extracted bandwidth of a speech sample. The speech is a clean sample from a Texas Instruments and Massachusetts Institute of Technology (TIMIT) database. The inaccuracies in bandwidth extraction (observed, e.g. at 2.5 seconds) are due to weak onset fronts in the high frequency speech components.

Figure 18:
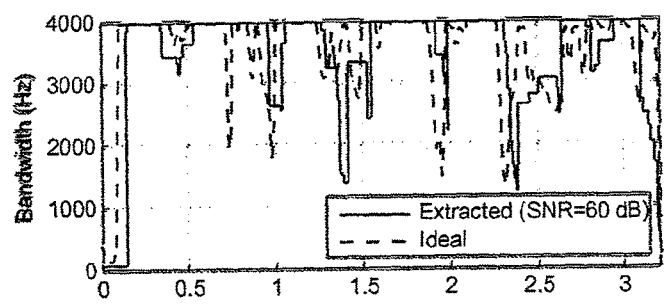
FIG. 18 illustrates a comparison between extracted and ideal bandwidth for a clean (60 dB SNR) speech sample from a TIMIT database in an embodiment.

FIG. 18 illustrates a comparison between extracted and ideal bandwidth for a clean speech sample that has a SNR of 60 dB from the TIMIT database in an embodiment. The errors in bandwidth extraction are mostly over-estimations, rather than under-estimations. These errors mean that speech energy would retain, but also that more power than necessary would be consumed to process non-speech signals.

The analog front-end circuit 102 adjusts its bandwidth to accommodate the highest frequency speech content, as determined by the algorithm. If the algorithm underestimates the bandwidth of the speech, then some amount of speech energy would be lost, which could be detrimental to the application as a whole. On the other hand, if the algorithm overestimates the bandwidth of the speech, then power would be wasted processing audio signals that are not actually relevant to the application. Algorithm parameters, such as the various time constants, or the integrator's spike number thresholds, can be tuned to balance the tradeoff between power savings and speech loss. The power saved by the acoustic front-end is inversely proportional to the average extracted bandwidth. For different parameter settings, the algorithm produces different average extracted bandwidths, and different rates of speech retention.

Figure 19:
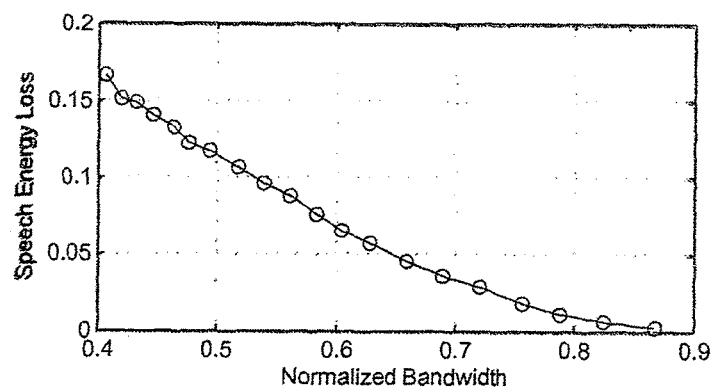
FIG. 19 is a plot of energy loss as a function of bandwidth

FIG. 19 illustrates average extracted bandwidth versus speech loss in an embodiment. An x-axis is the average of the extracted bandwidth, normalized to 4 kHz. The speech energy loss is relative to 1. Speech energy is lost whenever the algorithm underestimates the instantaneous bandwidth of the speech. However, the algorithm is such that the least energetic components of speech are lost first. Thus, even with a normalized bandwidth of 0.4, over 80% of the speech energy retains.

Figure 20:
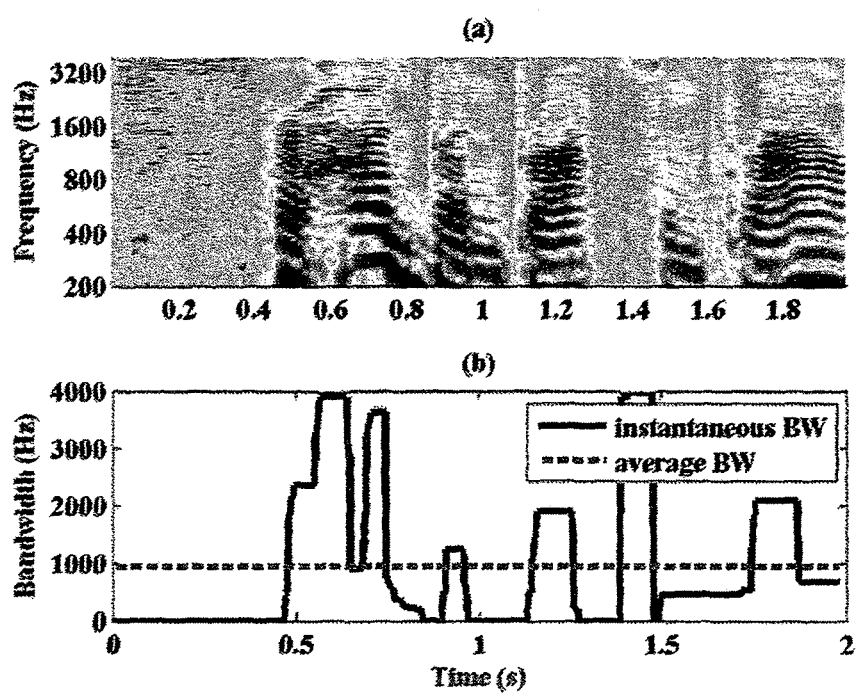
FIG. 20A is a spectrogram of a speech sample corrupted with background crowd noises in an embodiment.
FIG. 20B illustrates the instantaneous bandwidth of a speech sample vs time in an embodiment.

FIG. 20A is a spectrogram of a speech sample corrupted with background crowd noises in an embodiment. FIG. 20B illustrates the instantaneous bandwidth of the speech sample vs time in an embodiment. Even though the maximum bandwidth is 4 kHz, the average bandwidth of the speech is only 1 kHz. An analog front-end that adapts its performance to the instantaneous bandwidth of the speech would consume a fraction of the power of a conventional fixed-bandwidth system.

An Adaptive Microphone Preamplifier for Low Power Applications

The following section presents results for a prototype of the preamplifier that was controlled by a prototype acoustic object detector including the prototype spike generating circuit discussed earlier. The preamplifier 106 may be a microphone preamplifier that adapts its power consumption according to the input signal's instantaneous bandwidth. The preamplifier's dynamic range and gain keep reasonably constant, regardless of the power consumption. The preamplifier may be fabricated with a 0.5 µm CMOS process. The measurement results show that the preamplifier has over 79.5 dB dynamic range with 53.4% power saving compared to a non-adaptive conventional counterpart. Also, the adaptive processing only causes 6% energy loss for a speech sample.

Figure 21:
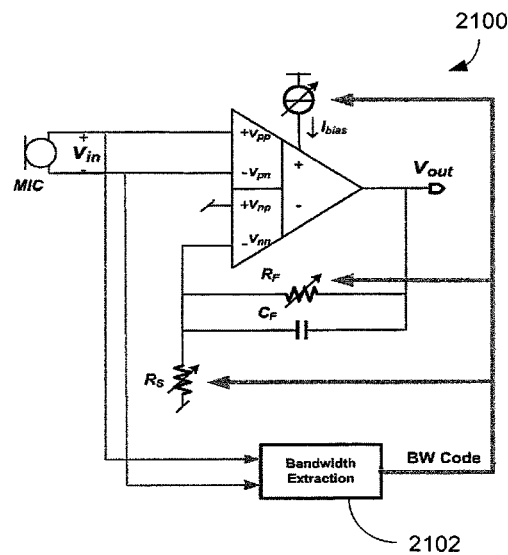
FIG. 21 illustrates a circuit diagram of a configurable preamplifier in an embodiment.

The main portion of the preamplifier is a non-inverting amplifier, implemented with a differential difference amplifier (DDA) and a resistive divider. FIG. 21 illustrates a circuit diagram of the configurable preamplifier based upon the DDA in an embodiment. The feedback capacitor, $C_F$, introduces a pole and higher-frequency zero, which provide some filtering capability. The function of the bandwidth extraction block 2102 determines the instantaneous bandwidth of the input signal. The bias current of the DDA and the values of the resistors are controlled by the output of the bandwidth extraction block 2102. The high input impedance is independent of $R_F$ and $R_S$, meaning that the preamplifier can be driven directly by a microphone's transducer. Such functionality is essential in highly integrated audio systems.

The bandwidth extraction block 2102 is based on the speech edge detection algorithm as discussed in Example II, which may split the speech signal into 128 bandpass frequency channels by a series of bandpass filters covering the 4 kHz speech band and detect the acoustic events' onsets and offsets in each channel by the spike-encoding circuits. Thus, the highest frequency content of an audio signal may be obtained in real time.

In a particular embodiment, spike-encoding circuit 700 uses 16 frequency channels in order to save power. Also, a low-power buffer is coupled between the microphone and the bandpass filters. The bandwidth extraction block 2102 generates a 4-bit thermometer code to represent the 16 levels of bandwidth and control the current and resistor DACs in the configurable preamplifier accordingly.

Figure 22:
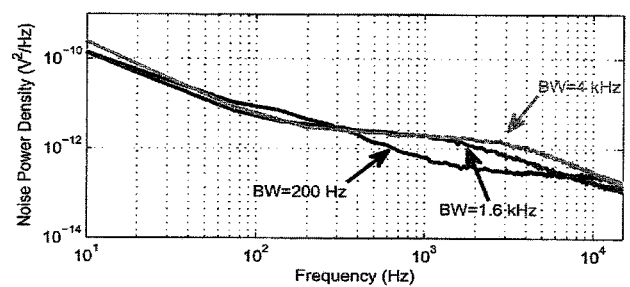
FIG. 22 illustrates output noise power density for three bandwidth configurations in an embodiment.

The configurable preamplifier circuit 2100 is fabricated in a 0.5 µm CMOS process. A preamplifier chip is used to verify if its performance is consistent with theoretical expectations. FIG. 22 illustrates noise power density for three bandwidth configurations or three different input tones in an embodiment. Note that the noise power density decreases with the increase of the bandwidth, while the bandwidth of the (thermal) noise power density increases with it. In addition, the flicker noise corner is about 200 Hz. The lower the frequency of the input tone, the higher the magnitude of the thermal noise power spectral density (PSD), and the smaller the noise bandwidth. A total input-referred noise is found to be 5.5 $\mu V_{rms}$, 7.5 $\mu V_{rms}$ and 8.4 $\mu V_{rms}$ for input tones of 200 Hz, 1.6 kHz and 4 kHz, respectively. For high frequency tones, the larger values of $I_{bias}$ tend to push the DDA input transistors out of sub-threshold operation. Thus, the level of thermal noise PSD is higher than expected, while the preamplifier bandwidth that is set by $R_F$ and $C_F$ is at a nominally expected value. This causes the total integrated noise to increase slightly for higher frequency input tones.

Figure 23:
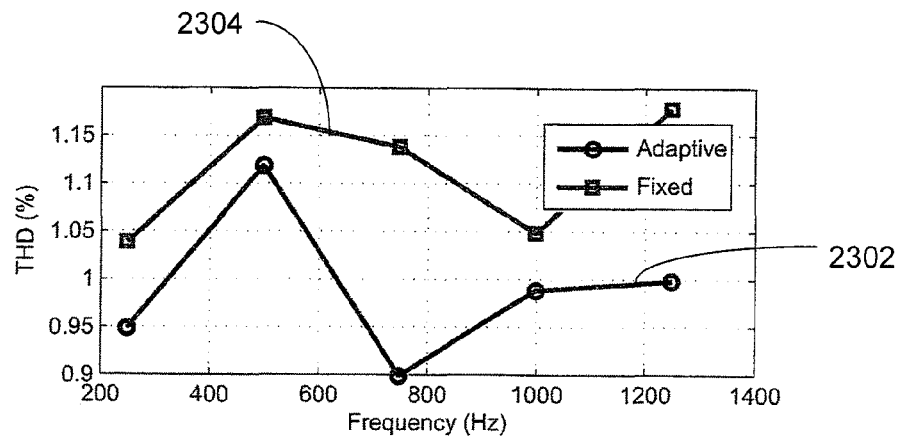
FIG. 23 illustrates total harmonic distortion (THD) of the preamplifier of FIG. 21 for 80 $mV_{rms}$ input sinusoid with typical frequencies in an embodiment.

FIG. 23 illustrates total harmonic distortion (THD) of the preamplifier of FIG. 21 for 80 $mV_{rms}$ input sinusoid with typical frequencies in an embodiment. The frequencies have their third order harmonics within the 4 kHz band. The THD is all close to 1% for adaptive-bandwidth amplifier (curve 2302), while is slightly higher for fixed 4 kHz amplifier (curve 2304). FIG. 23 shows the THD of the preamplifier circuit 2100 with an 80 $mV_{rms}$ input sinusoid. The THD of several typical frequency points are all close to 1%. In addition, compared to a conventional fixed-bandwidth amplifier, the THD of the adaptive preamplifier 2100 is lower. The reason for this is that the bandwidth of the adaptive preamplifier 2100 is often smaller than the fixed 4 kHz, which means that some harmonics would be filtered out.

Figure 24:
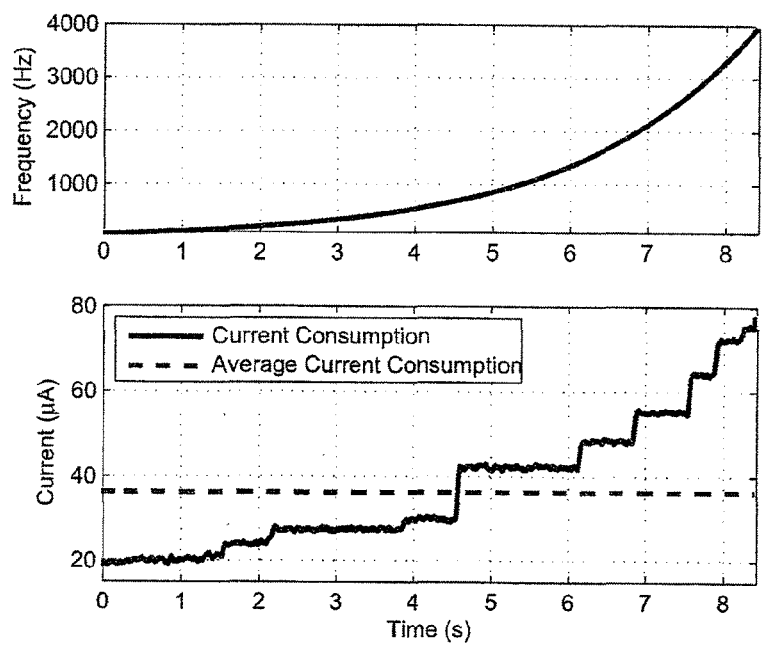
FIG. 24 shows power consumption of the preamplifier circuit of FIG. 21.

The preamplifier's adaptive power is determined by inputting a chirp signal that increases in frequency from 100 Hz to 4 kHz. FIG. 24 illustrates measurement results for an input chirp signal with its frequency sweeping from 100 Hz to 4 kHz logarithmically in 8.4 s (top) and the adaptive current consumption (bottom). The current consumption follows the trend of the chirp frequency, and its average is 46.6% of the maximum. FIG. 24 shows that the power consumption of the adaptive preamplifier 2100 adapts accordingly, following the general trend of the chirp frequency in an embodiment. The imperfections in the power adaptation can be traced to a few error sources. Inaccuracies in the bandwidth extraction block or circuit 2102, due to non-ideal bandpass filters, causes errors in the generated bandwidth code. Further, converting the bandwidth code to the corresponding values of $I_{bias}$ introduces nonlinearities.

Figure 25:
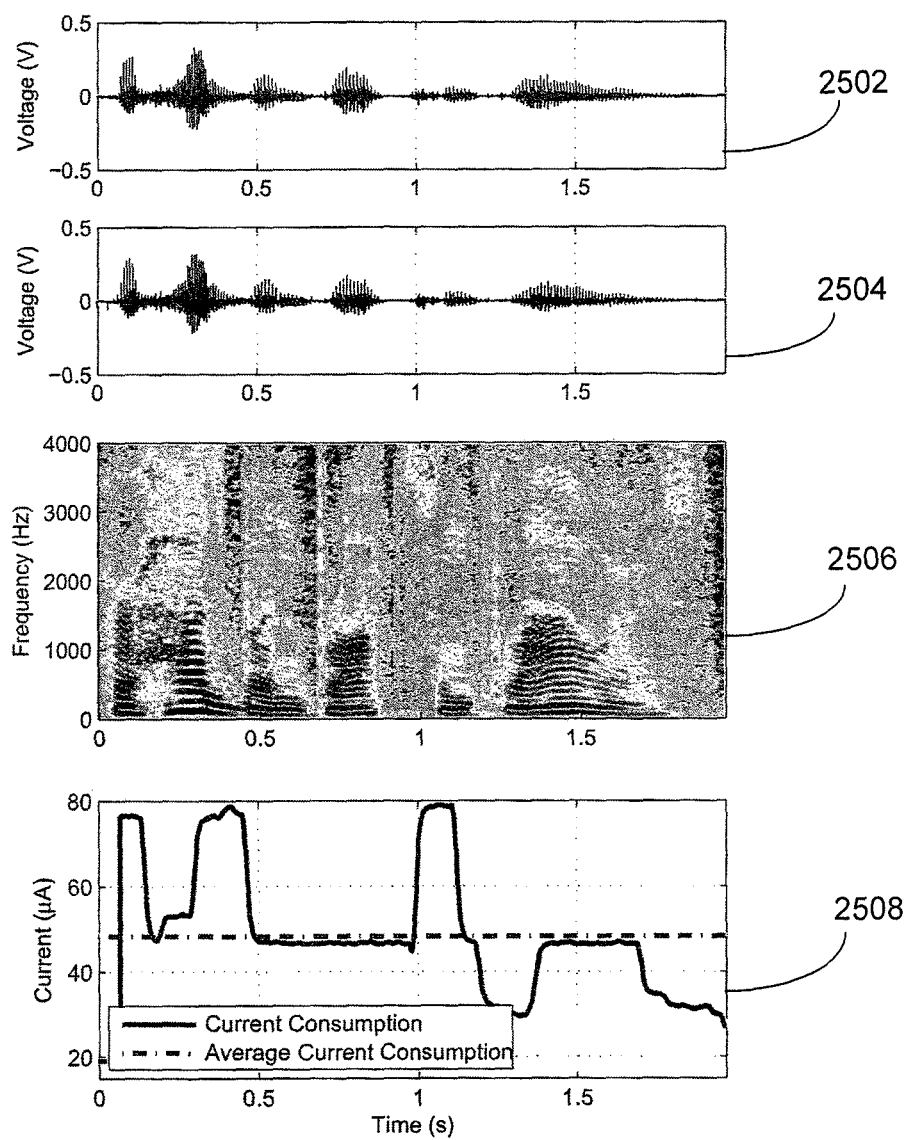
FIG. 25 illustrates measurement results for a speech sample with a fixed preamplifier, with an adaptive preamplifier, a speech spectrogram, and current consumption of the adaptive preamplifier in an embodiment.

Finally, the preamplifier's adaptive power behavior is demonstrated with a speech sample. FIG. 25 illustrates measurement results for a speech sample 2506 in an embodiment. Graph 2502 is for results with a fixed preamplifier. Graph 2504 is for results with an adaptive preamplifier. Graph 2508 is for the current consumption of the adaptive preamplifier. Note that the preamplifier's power consumption adaptively follows the speech's energy distribution on time-frequency plane, and the average power consumption is 61.5% of the maximum. Via this adaptive behavior, the adaptive preamplifier 2100 reduces its power consumption by almost 40%. This power savings comes at little cost to the quality of the speech; for this particular sample, 92.8% of the speech energy is preserved.

The adaptive preamplifier 2100 adapts its power consumption according to the input signal's instantaneous bandwidth and can save more than a half of the power consumption compared to its fixed-bandwidth counterpart. Also, the adaptive preamplifier 2100 maintains a dynamic range of over 79.6 dB regardless of the power consumption. This adaptive preamplifier 2100 can be used in an energy-efficient audio system.

Dynamic Power Scaling for Microphone Analog Front-Ends

The following section discloses that the analog front end can adapt its power consumption according to an instantaneous bandwidth of an input signal. A large percentage of the two-billion-units-per-year market for microphones is driven by a mobile phone handset industry, and this demand is steadily growing. For the mobile phone, battery life is of critical concern. Therefore, the microphone and its front-end circuitry must meet stringent power consumption specifications. Typical power numbers are about 500 µW for the preamplifier and about 200 µW for the ADC, and thus about 700 µW. One way of keeping the power consumption down is to provide a sleep mode when the microphone is not used. Low power digital ASICs and microcontrollers also have sleep modes, but beyond that, they also employ dynamic power scaling schemes, where the amount of active power consumption is adjusted according to the circuits' operating conditions. When dynamic power scaling is applied to analog components, then the analog components would have lower levels of active power consumption. Such a scheme is independent of process and architecture.

Figure 26:
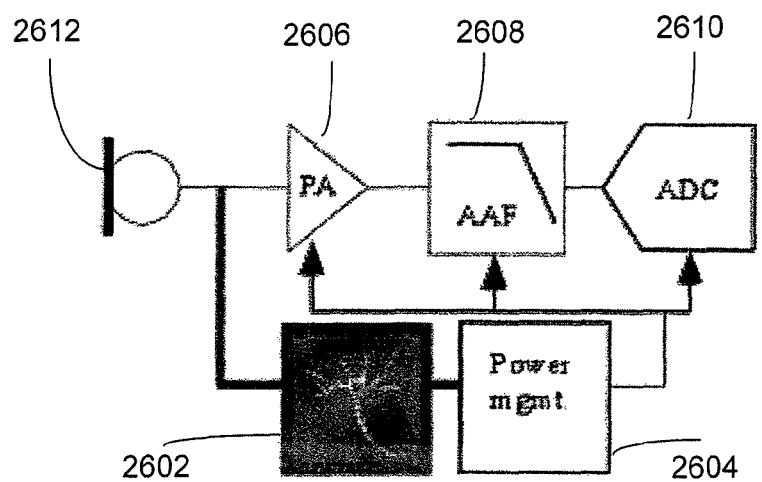
FIG. 26 is a simplified diagram illustrating a biologically-inspired speech monitoring module 2602 that continuously monitors an input signal from a microphone 2612 in an embodiment.

In a particular embodiment, a microphone with a front-end circuitry adapts the power consumption of the front-end circuitry to match the instantaneous bandwidth of input speech. FIG. 26 is a simplified diagram illustrating a biologically-inspired speech monitoring module 2602 that continuously monitors an input signal from a microphone 2612 in an embodiment. Depending on the features of the input, the biologically-inspired speech monitoring module 2602 sends control signals to a power management module 2604 to adjust the power that is delivered to the preamplifier 2606, anti-aliasing filter (AAF) 2608 and ADC 2610. As shown in FIG. 26, a low power (about 6 µW) biologically-inspired speech monitoring module 2602 continuously analyzes the input sound and sends control signals to the power management module 2604.

Figure 27:
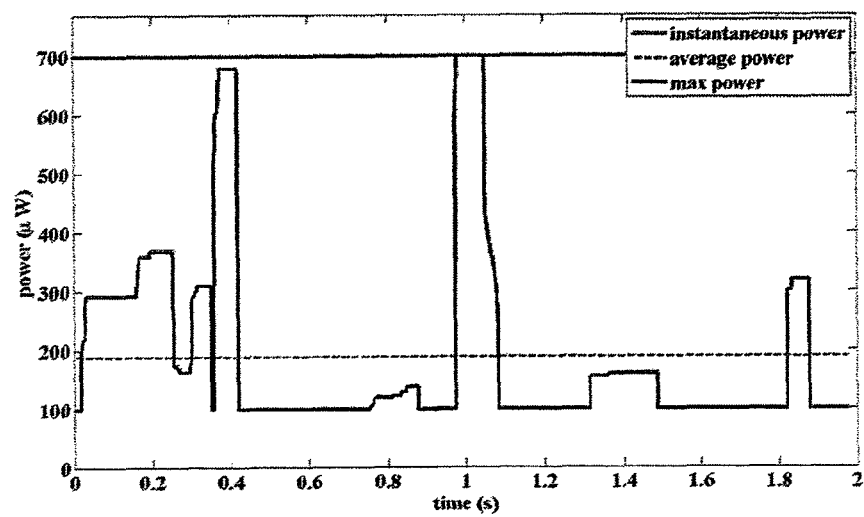
FIG. 27 illustrates simulated power consumption of a microphone front-end that employs dynamic power scaling during a period of active speech in an embodiment.

FIG. 27 illustrates simulated power consumption of a microphone front-end that employs dynamic power scaling during a period of active speech in an embodiment. The microphone front-end implements the dynamic power management scheme. The average power consumption is about 200 µW with dynamic power scaling, which is much lower compared to 700 µW for the conventional and non-adaptive front-end circuit. During periods of active speech, the power consumption of the microphone front-end can generally be reduced to half by applying the dynamic power scaling scheme. For a typical phone conversation, active speech takes only 50% of the time. During the periods of speech inactivity, the power consumption can be lowered to almost sleep-mode levels. Thus, the total active power consumption can be reduced by up to 75%.

Having described several embodiments, it would be recognized by those skilled in the art that various modifications, alternative constructions, and equivalents may be used without departing from the spirit of the invention. Additionally, a number of well-known processes and elements have not been described in order to avoid unnecessarily obscuring of the present invention. Accordingly, the above description should not be taken as limiting the scope of the invention.

Those skilled in the art will appreciate that the presently disclosed instrumentalities teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An acoustic sensor comprising:
    an acoustic object detector for detecting presence of an acoustic signal in an input signal, the acoustic object detector comprising:
    a plurality of analog bandpass filters each configured to convert an input signal into respective analog signal filtered within a frequency band;
    a plurality of spike generating circuits, each spike generating circuit having an analog signal from a respective one of the analog bandpass filters as a first input and being configured to output a series of spike signals of constant amplitude and having a density proportional to a rate of change of signal energy in the analog signal, and
    a decision circuit configured to generate a digital signal at a time-frequency point from the series of spike signals from the plurality of spike generating circuits;
    wherein the analog front-end comprises an analog-to-digital converter coupled to digitize an output of a lowpass filter coupled to receive the input signal;
    a power management apparatus adapted to control a power consumption of the analog-to-digital converter, in response to an output of the decision circuit.

2. The acoustic sensor of claim 1, wherein, within each of the plurality of spike generating circuits, an adaptive threshold is configured to increase at a constant step until exceeding the analog signal and then decay toward the analog signal.

3. The acoustic sensor of claim 1, wherein the decision circuit comprises:
    an edge detection unit having an integrator coupled to a thresholding unit for generating an output from the series of spike signals from the plurality of spike generating circuits; and
    a bandwidth encoding circuit to generate the digital signal from the output of the integrator.

4. The acoustic sensor of claim 1 wherein each spike generating circuit includes:
    a comparator having hysteresis and an analog signal from a respective one of the analog bandpass filters as a first input and an adaptive threshold as a second input, the comparator configured to compare the analog signal with the adaptive threshold to output a series of constant magnitude spike signals having density corresponding to a rate of change of signal energy in the analog signal, and
    a threshold generating circuit for generating the adaptive threshold, the threshold generating circuit including:
    an analog lowpass filter coupled between the first and second inputs of the comparator, the analog lowpass filter including a capacitor coupled to the second input of the comparator,
    a gated current source coupled to apply current to the capacitor that is coupled to the second input of the comparator, the gated current source activated by the comparator based upon a difference between the analog signal and the adaptive threshold to charge the capacitor and thereby change the adaptive threshold.

5. The acoustic sensor of claim 4, wherein the analog lowpass filter of each threshold generating circuit further includes a transconductance amplifier coupled between the first and second inputs of the comparator of the threshold generating circuit.

6. The acoustic sensor of claim 4, wherein the analog lowpass filter of each threshold generating circuit further includes a resistor coupled between the first and second inputs of the comparator of the threshold generating circuit.

7. The acoustic sensor of claim 4, wherein the analog lowpass filter of each threshold generating circuit further includes a transconductance amplifier coupled between the first and second inputs of the comparator of the threshold generating circuit.

8. The acoustic sensor of claim 4, wherein the analog lowpass filter of each threshold generating circuit further includes a resistor coupled between the first and second inputs of the comparator of the threshold generating circuit.

9. The acoustic sensor of claim 4, wherein within each of the plurality of spike generating circuits, the an adaptive threshold is configured to increase at a constant step until exceeding the analog signal and then decay toward the analog signal.

10. An analog front-end circuit comprising the acoustic sensor of claim 1 and further comprising a low pass filter coupled to receive the input signal and to provide a signal to an analog-to-digital converter, wherein the acoustic object detector is coupled to control a power dissipation of at least one of the low-pass filter and the analog-to-digital converter based upon a maximum frequency of the input signal as detected by the acoustic object detector.

11. The analog front-end of claim 10 wherein the acoustic object detector is coupled to control a power dissipation of the analog-to-digital converter by adjusting a bandpass of the low-pass filter and a sampling rate of the analog-to-digital converter.

12. An acoustic system comprising:
  an acoustic sensor for adjusting power consumption based upon an acoustic signal, comprising:
  a transducer for converting an acoustic signal into an electrical signal;
  a dynamically-reconfigurable analog front-end; and
  an acoustic object detector, including:
  a plurality of analog bandpass filters each configured to convert the electrical signal into a respective analog signal within a frequency band $f_i$;
  a plurality of spike generating circuits, each spike generating circuit having an analog signal from a respective one of the plurality of analog passband filters as a first input and being configured to output a plurality of spike signals of constant amplitude and having a density proportional to a rate of change of signal energy in the analog signal, and
  a decision circuit configured to generate a digital signal in binary form at a time-frequency point from the plurality of spike signals from the plurality of spike generating circuits;
  wherein the acoustic system further comprises an analog-to-digital converter coupled to digitize an output of a lowpass filter coupled to receive the acoustic signal; and
  a power management apparatus adapted to control a power consumption of the analog-to-digital converter, in response to an output of the decision circuit.

13. The acoustic sensor of claim 12, wherein the analog front-end comprises a preamplifier coupled to amplify the electrical signal.

14. The acoustic sensor of claim 13, wherein the analog front-end comprises a lowpass filter coupled to an output of the preamplifier.

15. The acoustic sensor of claim 12, wherein the transducer comprises a microphone, and the acoustic signal comprises a sound signal.

16. The acoustic sensor of claim 12, wherein the acoustic object detector is configured to serve as a speech edge detector.

17. The acoustic sensor of claim 16, wherein the decision circuit comprises:
  an edge detection unit having an integrator coupled to a thresholding unit for generating an output from the plurality of spike signals from the plurality of spike generating circuits; and
  a bandwidth encoding circuit to generate the digital signal from the output of the thresholding unit.

18. A spike generating circuitry for extracting an acoustic signal and encoding the acoustic signal as a series of constant magnitude spikes, the spike generating circuitry comprises:
  a comparator having a signal input and an adaptive threshold input and configured to compare the signal input with the adaptive threshold input to output a series of constant magnitude spike signals, the constant magnitude spike signals having a rate corresponding to a rate of change of the signal input; and
  a threshold generating circuit for generating the adaptive threshold input, the threshold generating circuit including:
    an analog lowpass filter coupled with the signal input and the adaptive threshold input of the comparator, the analog lowpass filter including a capacitor coupled to the adaptive threshold input of the comparator,
    a current source, and
    a transistor switch coupled between the current source and the capacitor, the transistor switch activated by the comparator based upon a difference between the signal input and the adaptive threshold input to charge the capacitor and thereby change the adaptive threshold.

19. The spike generating circuitry of claim 18, wherein the analog lowpass filter further includes a transconductance amplifier coupled between the signal and adaptive threshold inputs.

20. The spike generating circuitry of claim 18, wherein the analog lowpass filter further includes a resistor between the adaptive threshold input and the signal input of the comparator.

21. The spike generating circuitry of claim 18, wherein the adaptive threshold input increases at a constant step until exceeding the signal input and then decays toward the signal input.

* * * * *